United States Patent [19]

Pilley et al.

[11] Patent Number: 5,740,047
[45] Date of Patent: *Apr. 14, 1998

[54] GNSS BASED, SEAMLESS, MULTI-DIMENSIONAL CONTROL AND MANAGEMENT SYSTEM FOR VEHICLES OPERATING IN A MULTI-DIMENSIONAL ENVIRONMENT

[75] Inventors: Harold Robert Pilley; Lois V. Pilley, both of Hillsboro, N.H.

[73] Assignee: Harold R. Pilley, Hillsboro, N.H.

[ * ] Notice: The term of this patent shall not extend beyond the expiration date of Pat. No. 5,548,515.

[21] Appl. No.: 651,837

[22] Filed: May 21, 1996

Related U.S. Application Data

[63] Continuation of Ser. No. 117,920, Sep. 7, 1993, Pat. No. 5,548,515, which is a continuation-in-part of Ser. No. 758,852, filed as PCT/US91/07575, Sep. 12, 1991, abandoned, which is a continuation-in-part of Ser. No. 593,214, Oct. 9, 1990, Pat. No. 5,200,902.

[51] Int. Cl.$^6$ .................................................. G06F 163/00
[52] U.S. Cl. ...................... 364/439; 364/461; 342/36; 342/456; 340/961
[58] Field of Search ................... 364/427, 428, 364/436, 439, 440, 441, 460, 461, 449.7; 73/178 T; 340/435, 903, 961; 342/29, 36–38, 454–456

[56] References Cited

U.S. PATENT DOCUMENTS

| | | | |
|---|---|---|---|
| 3,868,497 | 2/1975 | Vietor | 364/440 |
| 3,875,379 | 4/1975 | Vietor | 364/440 |
| 4,706,198 | 11/1987 | Thurman | 364/439 |
| 4,823,272 | 4/1989 | Inselberg | 364/439 |
| 4,845,629 | 7/1989 | Murga | 364/439 |
| 5,200,902 | 4/1993 | Pilley | 364/439 |
| 5,265,023 | 11/1993 | Sokkappa | 364/439 |
| 5,268,698 | 12/1993 | Smith, Sr. et al. | 364/439 |
| 5,321,615 | 6/1994 | Frisbie et al. | 364/439 |
| 5,375,058 | 12/1994 | Bass | 364/427 |
| 5,539,398 | 7/1996 | Hall et al. | 364/449.7 |
| 5,543,802 | 8/1996 | Villevieille et al. | 364/449.7 |
| 5,548,516 | 8/1996 | Gudat et al. | 364/449.7 |
| 5,557,524 | 9/1996 | Maki | 364/449.7 |
| 5,559,520 | 9/1996 | Barzehar et al. | 364/449.7 |

*Primary Examiner*—Gary Chin

[57] ABSTRACT

A GNSS Based Multi-Dimensional Control and Management System for vehicles operating in a multi-dimensional environment is disclosed. GNSS compatible techniques provide for a seamless airport independent four (4) dimensional vehicular management capability. The system utilizes precise 3-dimensional maps, the Earth Centered Earth Fixed (ECEF) WGS-84 coordinate reference frame, local coordinate frames such as local and state plane grids, zone-based management processing, automated airport lighting control, collision prediction and avoidance processing, 4-dimensional waypoint navigation, and air traffic control and vehicle situational awareness through global management processes that allow for the safe and efficient management of an airport in the air and one the ground. The management methods and processes are also applicable to vehicles and aircraft operating in the airport space envelope as well as other remote user sites with or without the assistance of the air traffic controller. The methods and processes employed provide a fundamental framework for increased airport safety, operational efficiency, cost savings and improved automation.

11 Claims, 10 Drawing Sheets

PLAN VIEW

ECEF TOUCH AND GO TRAJECTORY SHOWING WAYPOINTS EVERY 20 SECONDS $B_{WT}, Y_T$

ECEF PLAN VIEW OF TRAJECTORY AND WAYPOINTS EVERY 20 SECONDS

ECEF Z AXIS VS TIME WITH WAYPOINTS ABOUT EVERY 20 SECONDS

FIG. 15

GNSS BASED, SEAMLESS, MULTI-DIMENSIONAL CONTROL AND MANAGEMENT SYSTEM FOR VEHICLES OPERATING IN A MULTI-DIMENSIONAL ENVIRONMENT

This submittal is a continuation of Ser. No. 08/117,920 filed Sep. 7, 1993 now U.S. Pat. No. 5,548,515 issued Aug. 20, 1996, which is a continuation in part of Ser. No. 758,852 filed as PCT/US91/07575 Sep. 12, 1991, abandoned which is a continuation-in-part of Ser. No. 593,214, Oct. 9, 1990 now U.S. Pat. No. 5,200,902 issued Apr. 6, 1993.

BACKGROUND OF THE INVENTION

Today's airport terminal operations are complex and varied from airport to airport. Airports today are, in many cases, the limiting factor in aviation system capacity. Each airport has a unique set of capacity limiting factors which may include; limited tarmac, runways, suitable approaches, navigational or/and Air Traffic Control (ATC) facilities.

Furthermore, operational requirements in the terminal area involve all facets of aviation, communication, navigation and surveillance. The satisfaction of these requirements with technological/procedural solutions should be based upon three underlying principles; improved safety, improved capacity and cost effectiveness.

The United States alone currently contains some 17,000 airports, heliports and seabases. Presently only the largest of these can justify the investment in dedicated navigation and surveillance systems while the vast majority of smaller airports have neither. Clearly, a new approach is required to satisfy aviation user, airport operator, airline and ATC needs.

It would therefore be an advance in the art to provide a cost effective Airport Control and Management System which would provide navigation, surveillance, collision prediction, zone/runway incursion and automated airport lighting control based on the Global Navigation Satellite System (GNSS) as the primary position and velocity sensor on board participating vehicles. It would be still a further advance of the art if this system were capable of performing the navigation, surveillance, collision prediction, and zone/runway incursion both on board the aircraft/vehicles and at a remote ATC, or other monitoring site.

With the advent of new technologies such as the Global Positioning System, communication and computer technology, the application of new technologies to the management of our airports can provide improved efficiency, enhanced safety and lead to greater profitability for our aviation industry and airport operators.

Considerable activity is now in progress on the integration of GPS technology into the aviation system. Efforts underway by such organizations as Harris Corporation, MIT Lincoln Labs, Terra Star and others are investigating the application of GPS to aviation.

On Aug. 12, 1993, Deering System Design Consultants, Inc. (DSDC) of Deering, N.H., successfully demonstrated their Airport Control & Management System (AC&M) to the Federal Aviation Administration (FAA). After many years of development efforts, the methods and processes described herein were demonstrated to Mike Harrison of the FAA's Runway Incursion Office, officials from the FAA's Satellite Program Office, the FAA New England Regional Office, the Volpe National Transportation System Center, the New Hampshire Department of Transportation, the Office of U.S. Senator Judd Gregg and the Office of U.S. Representative Dick Swett. This was the first time such concepts were reduced to a working demonstrable system. The inventor has taken an active stand to promote the technology in a public manner and, as such, may have informed others to key elements of this application. The inventor has promoted this technology. DSDC's airports philosophy has been described in general terms to the aviation industry since it was felt industry and government awareness was necessary. The intent of this application is to identify and protect key elements of the system.

With these and other objects in view, as will be apparent to those skilled in the art, the AC&MSM invention stated herein is unique and promotes public well being.

SUMMARY OF THE INVENTION

This invention most generally is a system and a method for the control of surface and airborne traffic within a defined space envelope. GNSS-based, or GPS based data is used to define and create a 3-dimensional map, define locations, to compute trajectories, speeds, velocities, static and dynamic regions and spaces or volumes (zones) including zones identified as forbidden zones. Databases are also created, which are compatible with the GNSS data. Some of these databases may contain, vehicle information such as type and shape, static zones including zones specific to vehicle type which are forbidden to the type of vehicle, notice to airmen (notams) characterized by the information or GNSS data. The GNSS data in combination with the databases is used, for example, by air traffic control, to control and manage the flow of traffic approaching and departing the airport and the control of the flow of surface vehicles and taxiing aircraft. All or a selected group of vehicles may have GNSS receivers. Additionally, all or a selected group may have bi-directional digital data and voice communications between vehicles and also with air traffic control. All of the data is made compatible for display on a screen or selected screens for use and observation including screens located on selected vehicles and aircraft. Vehicle/aircraft data may be compatibly superimposed with the 3-dimensional map data and the combination of data displayed or displayable may be manipulated to provide selected viewing. The selected viewing may be in the form of choice of the line of observation, the viewing may be by layers based upon the data and the objective for the use of the data.

It is, therefore, an object of this invention to provide the following:

1.) A 4-D process logic flow which provides a "seamless" airport environment on the ground and in the air anywhere in the world with a common 3-D coordinate reference and time 2.) An Airport Control and Management Method and System which utilizes GNSS, 3-D maps, precise waypoint navigation based on the ECEF reference frame, a digital full duplex communication link and a comprehensive array of processing logic methods implemented in developed operational software 3.) An Airport Control and Management Method and System where a vehicle based 4-D navigational computer and ATC computer utilize the same coordinate reference and precise time standard.

4.) A database management method compatible with 3-D waypoint storage and presentation in 3-D digital maps.

5.) A automated method utilizing the precise 3-D airport map for the definition and creation of airport routes and travel ways.

6.) A 4-D process logic flow which provides precise vehicle waypoint navigation in the air and on the ground.

This process allows for monitoring of on or off course conditions for vehicles and aircraft operating within the airport space envelope on board the vehicle.

7.) A 4-D process logic flow which provides precise ATC waypoint navigation mirroring of actual vehicles in the air and on the ground at ATC. This process allows for monitoring of on or off course conditions for vehicles and aircraft operating within the airport space envelope at the ATC computer 8.) A 4-D process logic flow performed on board the vehicle which provides for precise collision prediction based on 3-dimensional zones 9.) A 4-D process logic flow performed at the ATC computer which provides for precise collision prediction based on 3-dimensional zones 10.) A collision detection management method which utilizes the application of false alarm reducing methods 11.) An ATC process logic flow which detects 3-D runway incursions. The process logic then generates message alerts and controls airport lights 12.) An ATC zone management method which utilizes the application of false alarm reducing methods 13.) A vehicle process logic flow which detects 3-D runway incursions. The process logic then generates message alerts and sounds tones within the vehicle or aircraft 14.) A vehicle zone management method which utilizes the application of false alarm reducing methods 15.) A 4-D ATC process logic flow which manages ground and air "Clearances" with precise waypoint navigation aboard the vehicle and at the ATC computer.

16.) A 4-D ATC process logic flow which manages ground and air "Clearances" incorporating an integrated system of controlling airport lights.

17.) A 4-D vehicle process logic flow which manages ground and air "Clearances" with an integrated system of waypoint navigation.

18.) A method of management for 3-D spatial constructs called zones

19.) A method of management for 3-D graphical constructs called zones

20.) A method of management for the automated generation of a zones database at any airport 21.) A database management method for the storage of zones data. Zones database management methods are used aboard the vehicle and at ATC 22.) A operational management method where the ATC computer provides navigational instructions to vehicles and aircraft. The instructions result in a travel path with clear paths defined being displayed in an airport map 23.) A operational management method where the ATC computer provides navigational instructions to vehicles and aircraft The instructions result in waypoints being entered into a 4-D navigation computer 24.) A datalink message content which supports the above management methods and processes More specifically, the elements mentioned above form the process framework of the invention stated herein

BRIEF DESCRIPTION OF DRAWINGS

The invention, may be best understood by reference to one of its structural forms, as illustrated by the accompanying drawings, in which:

FIG. 14 graphs ECEF X and Y presentation of missed approach followed by a touch and go with waypoints indicated about every 20 seconds.

FIG. 15 graphs ECEF Z versus time of missed approach followed by touch and go, with waypoints about every 20 seconds.

DESCRIPTION OF PREFERRED EMBODIMENT

AC&M PROCESSING OVERVIEW

Figure 1:
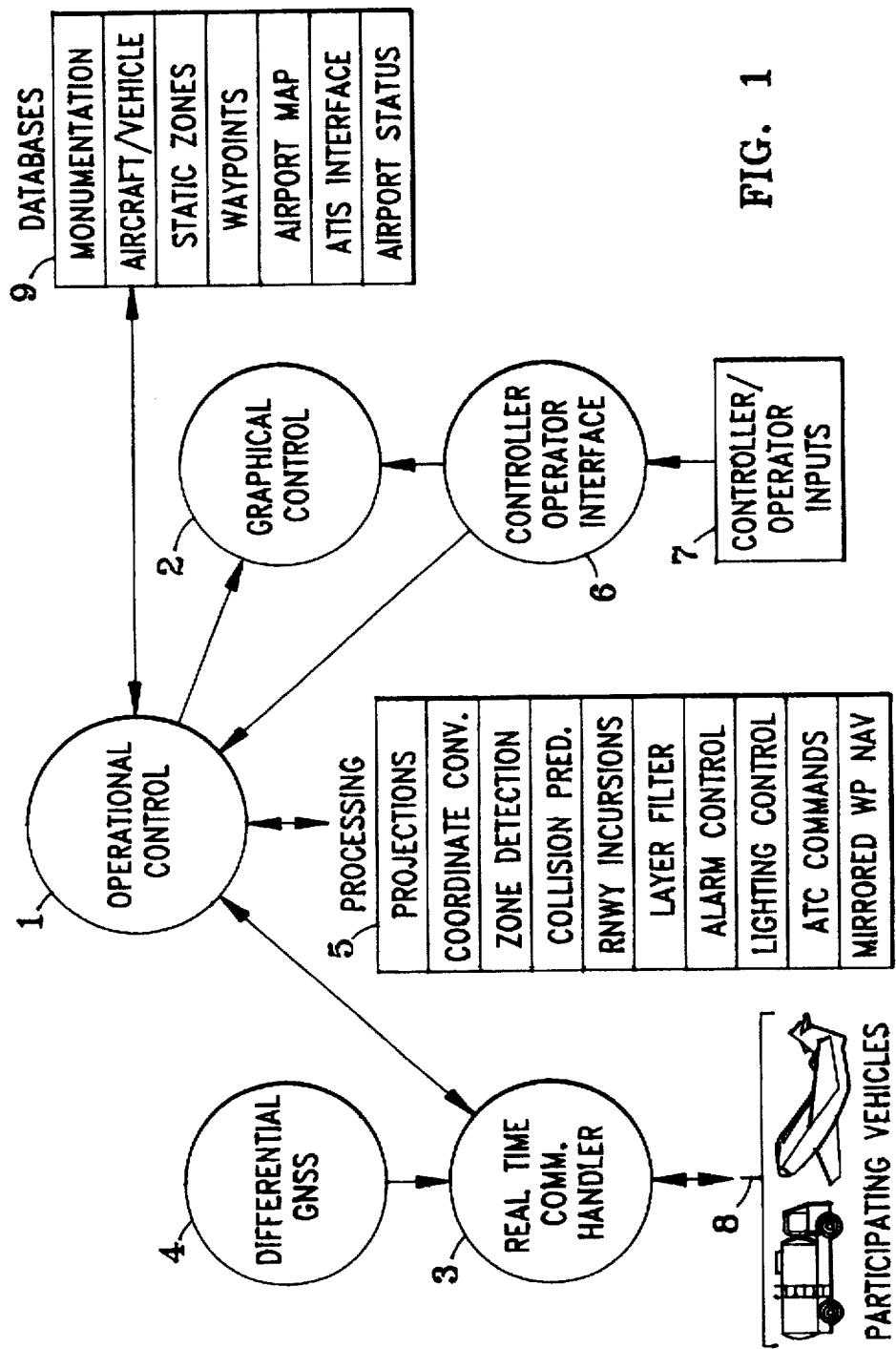
FIG. 1 depicts the high-level Airport Control and Management processing elements and flow.

The primary Airport Control and Management (AC&M) functions of the invention utilize a cartesian ECEF X, Y, Z coordinate frame compatible with GNSS. FIG. 1 provides additional detail for the operational elements of the AC&M processing. The GNSS signals broadcast by the vehicles 8 are processed by the Real Time Communication Handler 3 and sent to AC&M Operational Control 1. The Operational Control 1 uses the GNSS data to perform the following processing functions 5: position projections, coordinate conversions, zone detection, collision prediction, runway incursion detection, layer filter, alarm control, and lighting control. If waypoints have been issued to the vehicle 8, mirrored waypoint navigation is also performed by the AC&M processing. The Operational Control 1 interfaces directly to the Graphical Control 2. Graphics messages, including GNSS data and coded information pertaining to zone incursions, possible collision conditions, or off course conditions detected by the AC&M Processing, are passed to the Graphical Control 2. The Graphical Control 2 interprets this data and updates the display presentation accordingly.

The Operational Control 1 function also receives inputs from the Controller/Operator Interface 6. The Controller/Operator Interface uses the data received by Controller/Operator Inputs 7 to compose ATC commands which are sent to the Operational Control 1 function for processing. Commands affecting the presentation on the computer display screen are sent by the Operational Control 1 function to the Graphical Control 2. ATC commands composed by the Controller/Operator Interface 6 processing that do not require further AC&M processing are forwarded directly to the Graphical Control 2 to update the display screen. Both the Operational Control 1 function and Graphical Control 2 processing have access to the Monumentation, Aircraft/Vehicle, Static Zones, Waypoints, Airport Map, ATIS Interface and Airport Status and other low level data bases 9 to process and manipulate the presentation of map and vehicle data on a computer display screen.

More specifically, each vehicle 8 supports the capability to transmit a minimum of an identifier, the GNSS referenced position of one or more antennas, velocity, optional acceleration and time reports. Since this data is broadcast, it is accessible to the airport control tower, other aircraft and vehicles in the local area, and various airline monitoring or emergency command centers which may perform similar processing functions. ATC commands, processed by the Controller/Operator Interface 6 and Operational Control 1 function are passed to the Real Time Communication Handler 3 for transmission to the aircraft/vehicle(s) 8. Upon receipt of ATC messages, the vehicle(s) 8 return an acknowledgment message which is received by the Real Time communication Handler 3 and passed to the Operational Control 1 function. Differential GNSS corrections are generated by the Differential GPS Processor 4 and passed to the Real Time Communication Handler 3 for broadcast to the vehicles. The Real Time Communication Handler 8 performs the following functions at a minimum:

a. Initialize ATC computer communication lines
b. Initialize radio equipment
c. Establish communication links
d. Receive vehicle identifier, positions, velocity, time and other information
e. Receive information from ATC Processor to transmit to vehicle(s)
f. Receive ATC acknowledgment messages from vehicle (s)
g. Transmit information to all vehicles or to selected vehicles by controlling frequency and/or identifier tags
h. Monitor errors or new information being transmitted
i. Receive and broadcast differential correction data The AC&M techniques and methods described herein provide for GNSS compatible 4-Dimensional Airport Control and Management.

THE 3-D DIGITAL AIRPORT LAYOUT PLAN

The combination of ECEF navigation combined with NAD 83 (Lat, Lon, MSL and State Plane) and WGS 84 (X,Y,Z) based 3-D airport features are necessary in constructing an airport layout plan (ALP). The Airport Control and Management System (AC&M) requires that navigation and Automatic dependent Surveillance (ADS) information used in collision detection processing share the same coordinate frame. The processing methods described herein, require very accurate and properly monumented airport layout plans. Physical features surrounding the airport may be surveyed in a local coordinate frame and, as such, require accurate transformation into the airport map/processing coordinate frame. For these reasons, the use of multi-monumented coordinate references is mandatory for such map construction and survey. Clearly, highly accurate 3-D maps are required when using precise GNSS based navigation, collision avoidance and overall Airport Control and Management for life critical airport applications.

The 3-D ALP database and display presentation support the concept of zones. The display of zone information is managed using the Map Layer Filter. Zones are two and three dimensional shapes which are used to provide spatial cueing for a number of design constructs. Static zones may be defined around obstacles which may pose a hazard to navigation such as transmission towers, tall buildings, and terrain features. Zones may also be keyed to the airport's NOTAMS, identifying areas of the airport which have restricted usage. Dynamic zones are capable of movement. For example, a dynamic zone may be constructed around moving vehicles or hazardous weather areas. A route zone is a 3-D zone formed along a travel path such as a glide slope. Zone processing techniques are also applied to the management of travel clearances and for the detection of runway incursions. Zones may also be associated with each aircraft or surface vehicle to provide collision prediction information.

OPERATIONAL PROJECTIONS

AC&M projection processing utilizes received GNSS ADS messages from a datalink. The complete received message is then checked for errors using CRC error detection techniques or a error correcting code. The message contains the following information, or a subset thereof, but not limited to:

| PVT ADS DATA | |
|---|---|
| ID # | 8 Characters |
| VEHICLE TYPE | 4 Characters |
| CURRENT POSITION: | |
| X = ECEF X Position (M) | 10 Characters |
| Y = ECEF Y Position (M) | 10 Characters |
| Z = ECEF Z Position (M) | 10 Characters |
| X2 = ECEF X2 Position (M) | 2 Characters * |
| Y2 = ECEF Y2 Position (M) | 2 Characters * |
| Z2 = ECEF Z2 Position (M) | 2 Characters * |
| X3 = ECEF X3 Position (M) | 2 Characters * |
| Y3 = ECEF Y3 Position (M) | 2 Characters * |
| Z3 = ECEF Z3 Position (M) | 2 Characters * |
| VX = ECEF X Velocity (M/S) | 4 Characters |
| VY = ECEF Y Velocity (M/S) | 4 Characters |
| VZ = ECEF Z Velocity (M/S) | 4 Characters |
| AX = ECEF X Acceleration (M/S2) | 2 Characters # |
| AY = ECEF Y Acceleration (M/S2) | 2 Characters # |
| AZ = ECEF Z Acceleration (M/S2) | 2 Characters # |
| TIME | 8 Characters |
| TOTAL CHARACTERS/MESSAGE: | 80 Characters |

\* OPTIONAL FIELD, FOR DETERMINING VEHICLES ATTITUDE IN 3-D DIGITAL MAP DATA BASE
\# OPTIONAL ACCELERATION FIELD

A database is constructed using the ADS message reports. The AC&M processing converts the position and velocity information to the appropriate coordinate frame (if necessary, speed in knots and a true north heading). Simple first and second order time projections based upon position, velocity and acceleration computations are used. The ability to smooth and average the velocity information is also possible using time weighted averages.

ECEF POSITION PROJECTION TECHNIQUE $$\text{PROJECTED } X = X + (VX)(t) + (AX)(t^2)/2$$

$$\text{PROJECTED } Y = Y + (VY)(t) + (AY)(t^2)/2$$

$$\text{PROJECTED } Z = Z + (VZ)(t) + (AZ)(t^2)/2$$

This set of simple projection relationships is used in the collision prediction and zone incursion processing methods.

ZONE DATABASE

Zone areas may be defined in the initial map data base construction or may be added to the map database using a 2-D or 3-D data entry capability. The data entry device may be used to construct a zone using a digital map in the following manner:

Using the displayed map, the data entry device is used to enter the coordinates of a shape around the area to be designated as a zone. (An example may be a construction area closed to aircraft traffic listed in the current NOTAMS.)

The corners of the polygon are saved along with a zone type code after the last corner is entered. Circles and spheres are noted by the center point and a radius, cylinders are noted as a circle and additional height qualifying information. Other shapes are defined and entered in a similar fashion.

The zone is stored as a list of X, Y, Z coordinates. Lines connecting the points form a geometric shape corresponding to the physical zone in the selected color, line type and style in the proper layer of the base map.

Zone information may then be used by collision detection and boundary detection software contained in the AC&M system. This processing software is explained later in this specification.

Figure 2:
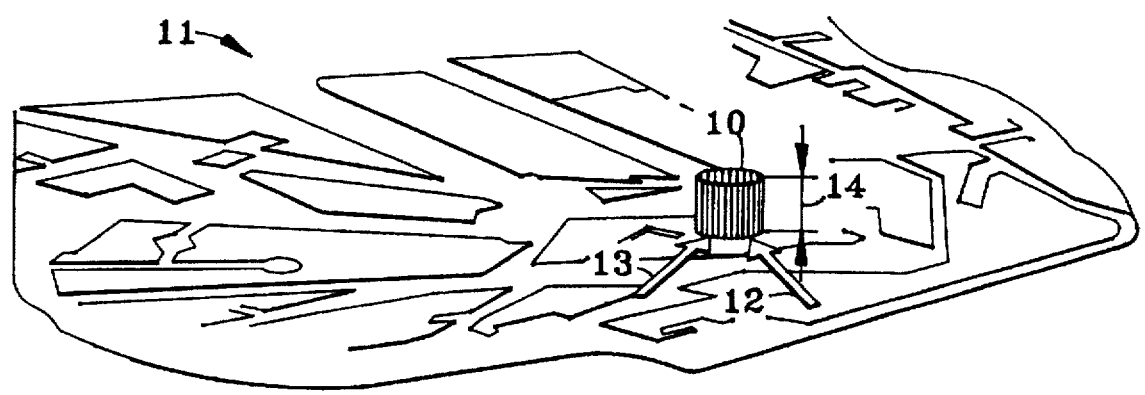
FIG. 2 represents an example of a cylindrical static zone in a 3-D ALP. This zone could be graphically displayed in a layer of the ALP.

FIG. 2 depicts a 3-D cylindrical static zone around a hypothetical utility pole. This zone 10 is added into the airport map 11, while the specific coordinates (center point of base 12, radius of circular base 13, and the height 14) are saved to the zone file list in a convenient coordinate frame.

Below is an example of a zone which is stored in the zone database.

| IDENTIFIER | PARAMETER |
| --- | --- |
| Utility pole | Type of Zone |
| Center of base | X, Y, Z |
| Radius of base | R |
| Height of the cylinder | H |

The 3-D digital map 11 is then updated using a series of graphic instructions to draw the zone 10 into the map with specific graphic characteristics such as line type, line color, area fill and other characteristics.

A database of zone information containing zones in surface coordinates such as X & Y state plane coordinates and mean sea level, ECEF referenced X, Y, Z and others are accessible to the AC&M Processing. The database may consist of, but is not limited to the following type of zones.

| OBJECT OF THE ZONE |
| --- |
| TRANSMISSION TOWERS |
| AIRPORT CONSTRUCTION AREAS |
| CLOSED AREAS OF AIRPORT |
| MOUNTAINS |

| OBJECT OF THE ZONE |
| --- |
| TALL BUILDINGS |
| AREAS OFF TAXIWAY AND RUNWAY |
| RESTRICTED AIRSPACE |
| INVISIBLE BOUNDARIES BETWEEN AIR TRAFFIC CONTROLLER AREAS |
| APPROACH ENVELOPE |
| DEPARTURE ENVELOPE |
| AREAS SURROUNDING THE AIRPORT |
| MOVING ZONES AROUND AIRCRAFT/VEHICLES |

ZONE PROCESSING

The zone information is retrieved from a zone database. As the AC&M Processor receives current ADS reports, information on each position report is checked for zone incursion. Further processing utilizes velocity and acceleration information to determine projected position and potential collision hazards. If a current position or projected position enters a zone area or presents a collision hazard an alert is generated.

A zone is any shape which forms a 2-D or 3-D figure such as but not limited to a convex polygon (2-D or 3-D), or a circular (2-D), spherical (3-D), cylindrical (3-D) or conical shape represented as a mathematical formula or as a series of coordinate points. Zones are stored in numerous ways based upon the type of zone. The coordinate system of the map and the units of measure greatly affect the manner in which zones are constructed, stored and processed.

The invention described herein utilizes four primary types of 2-D and 3-D zones in the Airport Control and Management System.

FOUR PRIMARY ZONE TYPES

Figure 3:
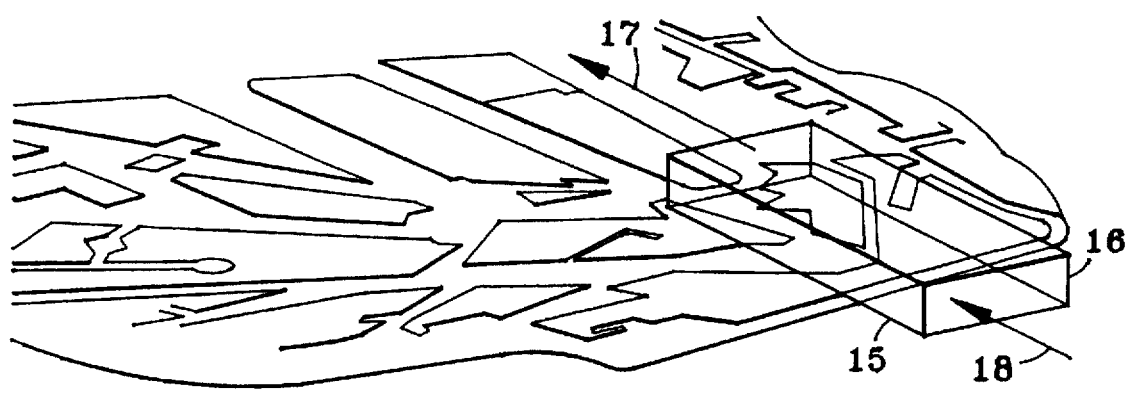
FIG. 3 represents an example of a static zone around a construction area of the airport and is used in zone incursion processing in the vehicles and at the ATC Processor.

The first type zone is a static zone as shown in FIG. 3. Static zones represent static non-moving objects, such as radio towers, construction areas, or forbidden areas off limits to particular vehicles. The zone 15 shown in the FIG. 3 represents a closed area of the airport which is under construction. The zone 15 is a 3-D zone with a height of 100 Meters 16, since it is desired not to have aircraft flying low over the construction site, but high altitude passes over the zone are permitted. An example of a permitted flyover path 17 and a forbidden fly through path 18 are shown in the figure. The fly through will produce a zone incursion, while the flyover will not.

Figure 4:
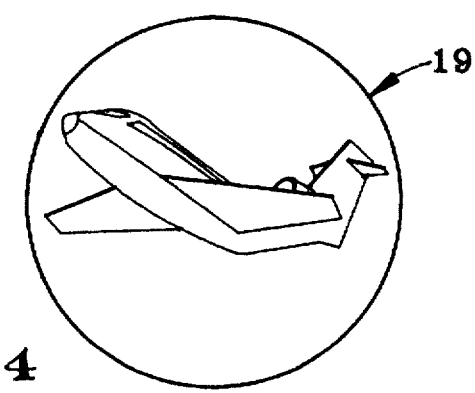
FIG. 4 represents an example of a dynamic zone which travels with a moving vehicle, in this case the zone represents the minimum safe clearance spacing which would be used in zone based collision detection processing in the vehicles and at the ATC processor.

A second zone type is shown in FIG. 4 and represents a dynamic zone 19 which moves with a moving vehicle or aircraft. Dynamic zones may be sized and shaped for rough check purposes or may be used to describe the minimum safe clearance distance. The dynamic zone is capable of changing size and shape as a function of velocity and or phase of flight and characterized by vehicle or aircraft type.

Figure 5:
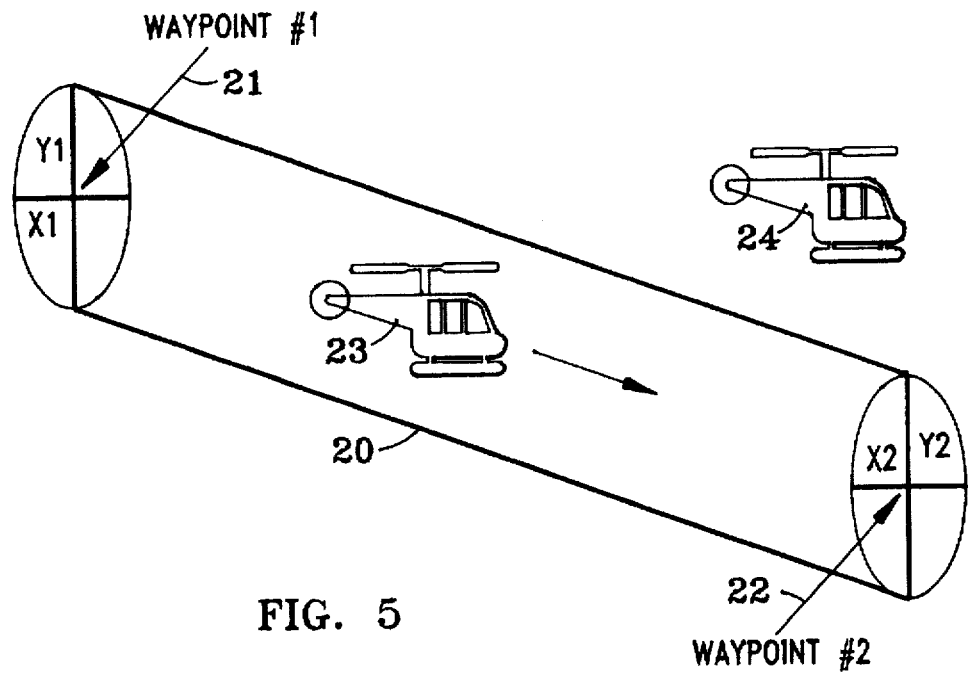
FIG. 5 represents an example of a route zone which is defined by navigational waypoints and is used for on\off course processing and is used in the vehicles and at the ATC Processor.

The third type of zone is shown in FIG. 5 and is a route zone 20. Route zones are described though the use of travel waypoints 21 and 22. The waypoints 21 and 22 define the center line of a travel path, the zone has a specified allowable travel radius X1, Y1 at Waypoint 1 21 and X2, Y2 at Waypoint 2 22 for the determination of on or off course processing. For simplicity X1 may equal X2 and Y1 may equal Y2. On course 23 operations result in travel which is within the zone, while off course 24 operations result in travel which is outside the zone and result in an off course warning.

Figure 6:
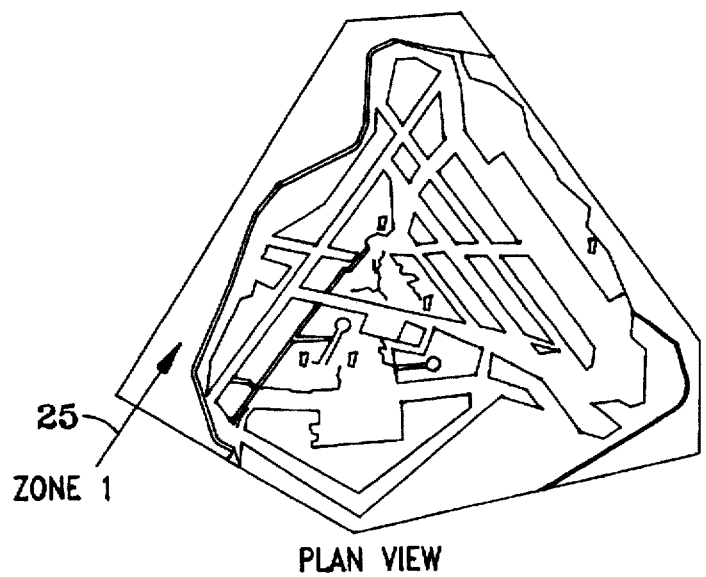
FIG. 6 represents an example of a 3-D ATC zone, used to segregate tracked vehicles to particular ATC stations.
Figure 6:
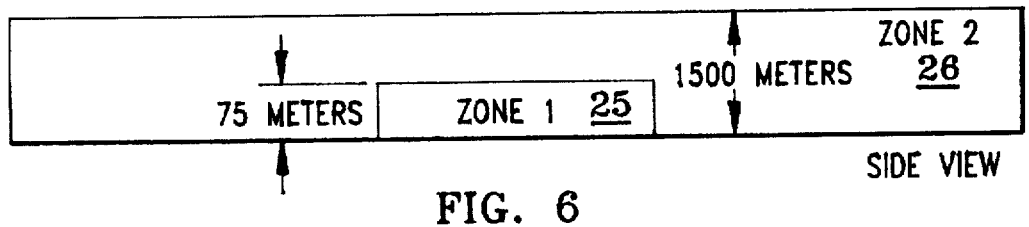

The fourth type zone(s) shown in FIG. 6 is a 3-D zone which is dynamic and used to sort ATC traffic by. This type zone is used to segregate information to various types of controller/operator positions, i.e. ground control, clearance delivery, Crash Fire and Rescue and others. Travel within a particular zone automatically defines which ATC position or station the traffic is managed by. For example travel within zone 1 25 is directed to ATC ground station, while travel within zone 2 26 is directed to ATC Clearance Delivery position. The ATC zone concept allows for automatic hand-off from one controllers position to the other as well as providing overall database the management automation.

The construct of zones is very important to the overall operation of the described invention herein. Further examples of zone processing methods and zone definition is provided below.

EXAMPLE 1

A cylindrical zone on the airport surface constructed using the state plane coordinate system would be represented as the following:

| | |
|---|---|
| Center point of circle | CXsp value, CYsp value |
| Elevation (MSL) | Elev = constant, or may be a range |
| Circle radius | CR value |

The detection of a zone incursion (meaning that the position is within the 2-D circle) is described below.

| | |
|---|---|
| Convert position to State Plane coordinates | |
| Current or projected position | Xsp, Ysp |
| Subtract circle center from current position | Xsp − CXsp = DXsp<br>Ysp − CYsp = DYsp |
| Determine distance from circle center | $DXsp^2 + Dysp^2 = Rsp^2$ |
| Test if position is in circle | Rsp <= CR |
| | If true continue<br>If not true exit not in zone |
| Test if position is within altitude range (a cylindrical zone) | Min Elev <= Elev <= Max Elev |

If the above conditions are met, the position is in the 3-D cylindrical zone. It can be seen that the basic methods used here are applicable to other grid or coordinate systems based on linear distances.

EXAMPLE #2

A cylindrical zone on the airport surface (normal with the airport surface) constructed using the Earth Centered Earth Fixed coordinate system is stored using three axis (X, Y, Z).

| | |
|---|---|
| Convert current position to ECEF | X, Y, Z |
| Center point of circle | CX value, CY value, CZ value |
| Circle radius | CR value |
| Determine distance from current or projected position to center of circle | (X − CX) = DX<br>(Y − CY) = DY<br>(Z − CZ) = DZ |
| Determine radial distance to circle center point from current position | $DX^2 + DY^2 + DZ^2 = R^2$ |
| Test position to see if it is in sphere of radius R | R <= CR |
| | If true continue<br>If not true exit not in zone |
| Determine the vector between the center of the circle and the center of mass of the earth | VC = CXE + CYE + CZE |
| Calculate its magnitude | $VC^2 = CXE^2 + CYE^2 + CZE^2$ |
| Determine the vector between the center of mass of the earth and the current or projected position | V = VX + VY + VZ |
| Calculate its magnitude | $V^2 = VX^2 + VY^2 + VZ^2$ |
| Determine the difference between the two vectors, if result = 0 then in the 2-D zone, if the result is <0 then position is below, if >0 then position is above the zone | V − VC = 0 |
| To check for incursion into an ECEF cylindrical zone, the following is tested for. | |
| Test if position is within Vector range (a cylindrical zone) | Min VC <= V <= Max VC |
| Where | Min VC represents the bottom of the cylinder<br>Max VC represents the top of the cylinder |

The final two tests use an approximation which greatly simplifies the processing overhead associated with zone incursion detection. The assumption assumes that over the surface area of an airport, the vector between the center of mass of the earth circular zone center and the vector from the current position to the center of the circle are coincident. That is, the angle between the two vectors is negligible.

The second assumption based on the first approximation is that, rather than perform complex coordinate reference transformations for zone shapes not parallel with the earth's surface, projections normal to the surface of the earth will be used. Zones which are not parallel with the earth's surface are handled in a manner similar to that applied to on or off course waypoint processing using rotation about a point or center line.

EXAMPLE #3

A zone which is shaped like a polygon is initially defined as a series of points. The points may be entered using a data entry device and a software program with respect to the digital map or they may be part of the base digital map. The points are then ordered in a manner which facilitates processing of polygon zone incursion. The following examples indicate how a (4 sided) polygon is stored and how an airport surface zone incursion is performed using both the state plane coordinates and Earth Centered Earth Fixed X, Y, Z coordinates.

| | |
|---|---|
| Convert Position to SP | Xsp, Ysp, |
| State Plane Zone | X1sp, Y1sp; X2sp, Y2sp; |
| Vertices | X3sp, Y3sp; X4sp, Y4sp |
| Order in a clockwise direction | |
| Height of 3-D zone | min Elev max Elev |
| Determine min & max values for X & Y | Xspmax, Xspmin, Yspmax, Yspmin |
| Perform rough check of current position or projected position | Is Xspmin <= Xsp <= Xspmax<br>Is Yspmin <= Ysp <= Yspmax |
| | If both true then continue with zone checking<br>If not true exit, not in zone |
| Calculate the slope of the line between points 1 & 2 | (Y2sp − Y1sp)/(X2sp − X1sp) = M |
| Calculate the slope of the line from the present position normal to the line between points 1 & 2 | Mnor = −1/m |
| Determine the equation between points 1 & 2 | Y1sp − M * X1sp = L |
| Determine the equation for the line normal to the line between points 1 & 2 and position | Ysp − Mnor * Xsp = LN |
| Determine the intersection | intxsp = (LN − L)/(M − Mnor) |

| -continued | |
|---|---|
| of both lines | intYsp = Mnor * intxsp + (Ysp − Mnor * Xsp) |
| Determine the offset from position to intersect point on the line between points 1 & 2 | Xsp − intxsp = DXsp<br>Ysp − intYsp = DYsp |
| Perform check to see which side of the line the position is on | Check the sign of DXsp<br>Check the sign of DYsp |
| If the point is on the proper side continue and check the next line between points 2 & 3 and perform the same analysis | Meaning the signs are o.k. |
| If the line is on the wrong side of the line, then not in the zone hence exit | |
| If point is on the proper side of all (4) lines of polygon then in 2-D zone | |
| Note: if the zone vertices are entered in a counter clockwise direction the sign of DXsp and DYsp are swapped. | |
| Test if position is within altitude range (a 3-D polygon zone) | Min Elev <= Elev <= Max Elev |

EXAMPLE #4

Figure 7:
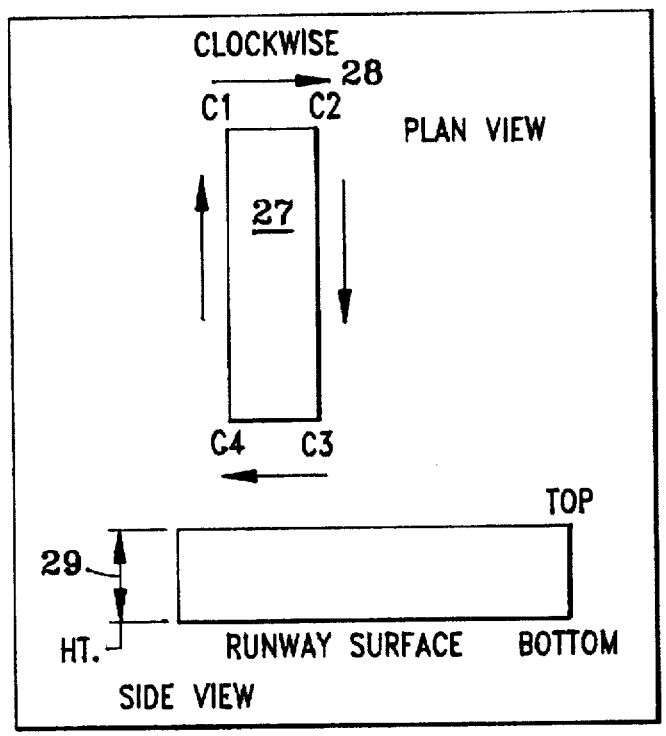
FIG. 7 illustrates the construction of a 3-D runway zone.

A further example is provided in the definition of a 3-D runway zone using ECEF X,Y,Z. A list of runway corners is constructed using the 3-D map and a data entry device and an automated software tool. The runway zone is shown in FIG. 7.

The horizontal outline the runway 27 by selecting the four corners C1,C2,C3,C4 in a clockwise direction 28, starting anywhere on the closed convex polygon formed by the runway 27

Define the thickness of the zone (height above the runway) 29

The 4 corner 3-D coordinates and min and max altitudes are obtained through the use of a program using the ALP, then conversion are performed if necessary to convert from ALP coordinates to ECEF X, Y, Z values.

$$C1 = X1,Y1,Z1 \quad C2 = X2,Y2,Z2$$
$$C3 = X3,Y3,Z3 \quad C4 = X4,Y4,Z4$$

$$MINALT = SQRT(XMIN^2 + YMIN^2 + ZMIN^2)$$

$$MAXALT = SQRT(XMAX^2 + YMAX^2 + ZMAX^2)$$

$$HEIGHT = MAXALT - MINALT$$

Define the (4) planes formed by the vectors originating at the center of mass of the earth and terminating at the respective four runway corners. Represent the 4 planes by the vector cross product as indicated below:

$$XP1 = C1 \times C2 \quad XP2 = C2 \times C3$$
$$XP3 = C3 \times C4 \quad XP4 = C4 \times C1$$

Store the vector cross products in the polygon zones database, where the number of stored vector cross products equals the number of sides of the convex polygon Determine if the present position or projected position is within the zone (PP=position to be checked)

$$PP = PX1, PY1, PZ1$$

Determine the scalar Dot product between the current position and the previously calculated Cross Product $$DP1 = PP*XP1 \quad DP2 = PP*XP2$$
$$DP3 = PP*XP3 \quad DP4 = PP*XP4$$

If the products are negative then PP is within the volume defined by intersection planes, if it is positive then outside the volume defined by the intersecting planes.

Note: the signs reverse if one proceeds around the zone in a counter clockwise direction during the definition process Determine if PP is within the height confines of the zone Determine the magnitude of the PP vector, for an origin at center of mass of the earth.

$$PPM = SQRT[(PX1)^2 + (PY1)^2 + (PZ1)^2]$$

Compare PPM=(PP magnitude) to minimum altitude of zone and maximum altitude of zone $$MINALT <= PPM <= MAXALT$$

If the above relationship is true then in the zone.

If false then outside of the zone

An alternate method of determining if the present position PP is within a zone which is not normal to the earth's surface is determined using a method similar to that above, except that all N sides of the zone are represented as normal cross products, the corresponding Dot products are calculated and their total products inspected for sign. Based upon the sign of the product PP is either out of or inside of the zone.

An example of actual Zone and Runway Incursion software code is contained shown below. The actual code includes interfaces to light control, clearance status, tones and other ATC functions.

SAMPLE PROGRAM #1
/*******************************************************************
File Name : gen_zone.c Description : gen_zone.c contains the procedures used to read the
user specified zone file and convert the points to
the normal vectors to the planes formed by the vector
pairs. The normal vectors are then stored to a new
data file along with the min and max radial height for
the zone. This information is used by rt-track to
determine if a vehicle is within the zone boundary.

Units : read_zonefile,
get_min_max,
convert_zone,
calc_normal_vectors

```
Link       n_zone.c cnvtcord.c
*************************************************************/
#include <stdio.h>      /* standard input/output     */
#include <graph.h>      /* MSC graphics routines     */
#include <string.h>     /* MSC string routines       */
#include <stdlib.h>     /* MSC standard library      */
#include <math.h>       /* MSC math library    */
#include "sio.h"        /* serial input/output       */
#include "coord.h"      /* coordinate conversion factors */
#include "rtzones.h"    /* zone structure definition   */

/*----------------- external procedures ----------------------*/
extern POINT *cnvt_to_ecef(POINT *wp);
extern void read_coord_data(void);

/*------------------ global definitions ------------------------*/
short coord_type;       /* coordinate system for zone */
short no_zone;          /* flag indicating zones found in file */
char zone_file[15];     /* name of file containing zones   */
char coord_file[15];    /* name of coordinate conversion file */
int num_zones;          /* total number of zones entered   */
ZONE_AREA zone[MAX_ZONES]; /* zone data structure      */
FILE *zfile;            /* converted zone file - used by rt-track*/
/*-----------------------------------------------------------

UNIT    read_zonefile()

DESCRIPTION: read_zonfile opens and reads the zone.dat file. As
             each zoned area is read, its values are stored in the
             zone record structure (see rtzone.h). The total number
             of zones is stored in the num_zones variable.
-----------------------------------------------------------*/
read_zonefile()
{
```

```
           FILE *zonefile;        /* file containting zoned area information */
           short i = 0;           /* index into array of zoned areas         */
           short j;               /* index into array of points              */
           short num_points;      /* number of points for a zoned area       */
 5         char *token;           /* field read in from file string          */
           char data_str[80];     /* line read from file                     */ if ((zonefile = fopen(zone_file,"r")) != NULL)
           {
10             while ((feof(zonefile) == 0) && (i < MAX_ZONES))
               {
                   /* read next line in zone datafile, store data in data_str */
                   if (fgets(data_str,MAX_STR-1,zonefile) != NULL)
                   {
15                     zone[i].zone_id = atoi(data_str);       /* zone id           */
                       fgets(data_str,MAX_STR-1,zonefile);     /* # of points in area */
                       zone[i].num_lines = atoi(data_str);

for (j = 0; j < zone[i].num_lines; j++)
20                     {
                           fgets(data_str,MAX_STR-1,zonefile);   /* point (x,y) */
                           token = strtok(data_str," ");
                           zone[i].p[j].x = atof(token);
                           token = strtok(NULL," ");
25                         zone[i].p[j].y = atof(token);
                           token = strtok(NULL," ");
                           zone[i].p[j].z = atof(token);
                       }
                       fgets(data_str,MAX_STR-1,zonefile);    /* zone type */
30                     zone[i].zone_type = atoi(data_str);
                       i++;
                   }   /* if fgets */
               }       /* while feof */
               num_zones = i;
```

```
          }
          else
          {
            _clearscreen(_GCLEARSCREEN);
 5          _settextposition(10,10);
            printf("No zone datafile entered. Function not enabled. Press ENTER.");
            getch();
          }
        }
10      /*----------------------------------------------------------------
        UNIT:   get_min_max()

DESCRIPTION: get_min_max determines the min and max values for the
                           x,y and z coordinates of the zoned area. The values are determined
15                         by comparing each x, y and z value stored in the zone record
                           structure. The min and max values are then stored in the zone record.
        ----------------------------------------------------------------*/
        get_min_max()
        {
20        POINT_XYZ min;
          POINT_XYZ max;
          /* temporary storage values for min, max values */
          double max_x;
          double max_y;
25        double max_z;
          double min_x;
          double min_y;
          double min_z;

30        short j,i;  /* counter */ for (j = 0; j < num_zones; j++)
          {
            min_x = zone[j].p[0].x;
```

```
        max_x = zone[j].p[0].x;
        min_y = zone[j].p[0].y;
        max_y = zone[j].p[0].y;
        min_z = zone[j].p[0].z;
        max_z = zone[j].p[0].z;

for (i = 1; i < zone[j].num_lines; i++)
        {
         if (zone[j].p[i].x > max_x)
            max_x = zone[j].p[i].x;
         if (zone[j].p[i].x < min_x)
            min_x = zone[j].p[i].x;
         if (zone[j].p[i].y > max_y)
            max_y = zone[j].p[i].y;
         if (zone[j].p[i].y < min_y)
            min_y = zone[j].p[i].y;
         if (zone[j].p[i].z > max_z)
            max_z = zone[j].p[i].z;
         if (zone[j].p[i].z < min_z)
            min_z = zone[j].p[i].z;
        } /* for i */ max.x = max_x;
        max.y = max_y;
        max.z = max_z;
        min.x = min_x;
        min.y = min_y;
        min.z = min_z;

/* calculate center point using min/max values */
        zone[j].center.x = (max.x - min.x)/2 + min.x;
        zone[j].center.y = (max.y - min.y)/2 + min.y;
        zone[j].center.z = (max.z - min.z)/2 + min.z;
```

```
                                        27

} /* for j */

}
    /*---------------------------------------------------------------
5   UNIT:        convert_zone()

DESCRIPTION: convert_zone converts the zone points from nhsp feet to
                 decimal degrees (pp.lat, pp.lon) and ecef x,y,z. The
                 ecef x,y,z values are stored back in the zone structure.
10  ---------------------------------------------------------------*/
    convert_zone()
    {
        int j,i;                /* counters */
        POINT_XYZ nhsp;         /* zone line endpoint in nhsp meters */
15      POINT_XYZ nhsp_center;  /* center point of zone in nhsp meters  */
        POINT pp,*pp_ptr;       /* current zone point, used in conversions */ for (j = 0; j < num_zones; j++)
        {
20          for (i = 0; i < zone[j].num_lines; i++)
            {
                /* convert nhsp points to decimal degrees */
                if (coord_type == 3) /* convert to meters */
                {
25
                    nhsp.x = zone[j].p[i].x * FTTOM;
                    nhsp.y = zone[j].p[i].y * FTTOM;
                    nhsp.z = zone[j].p[i].z * FTTOM;
                    nhsp_center.x = zone[j].center.x * FTTOM;
30                  nhsp_center.y = zone[j].center.y * FTTOM;
                    nhsp_center.z = zone[j].center.z * FTTOM;
                }

/* store endpoint in pp structure for conversion to ecef */
```

28

```
         pp.lon = (ULLON - LRLON) * (nhsp.x - LRX) / (ULX - LRX) + LRLON;
         pp.lat = (ULLAT - LRLAT) * (nhsp.y - LRY) / (ULY - LRY) + LRLAT;
         pp.alt = nhsp.z;

5        /* convert point to ecef coordinates */
         pp_ptr = cnvt_to_ecef(&pp);

/* store ecef endpoints back in zone structure */
         zone[j].p[i].x = pp.x;
10       zone[j].p[i].y = pp.y;
         zone[j].p[i].z = pp.z;

} /* for each line (i) in zone */

15       /* store centerpoint in pp structure for conversion to ecef */
         pp.lon = (ULLON - LRLON) * (nhsp.x - LRX) / (ULX - LRX) + LRLON;
         pp.lat = (ULLAT - LRLAT) * (nhsp.y - LRY) / (ULY - LRY) + LRLAT;
         pp.alt = nhsp_center.z;

20       /* convert point to ecef coordinates */
         pp_ptr = cnvt_to_ecef(&pp);

/* store ecef centerpoint back in zone structure */
         zone[j].center.x = pp.x;
25       zone[j].center.y = pp.y;
         zone[j].center.z = pp.z;

} /* for each zone (j) */
     }
30   /*---------------------------------------------------------------
     UNIT:    calc_normal_vectors DESCRIPTION: This routine calculates the radial height of the zone,
                  the minimum and maximum values for the zone height and
```

```
            the normal vectors to the planes formed by the vector
            pairs. The normal vectors are calculated by taking the
            cross product of the current endpoint with the next
            endpoint, wrapping back to the first point when the
5           current endpoint is the last endpoint.
   -----------------------------------------------------------------*/
   calc_normal_vectors()
   {

10     int j,i;                         /* counters */
       double r;                        /* radial height of zone, in ecef */
       double min_zone_ht, max_zone_ht; /* min and max values for zone ht */
       POINT_XYZ normal_vec;            /* normal vector for the current vector pair */
       int next_point=0                 /* next point to check in zone       */

15
       for (j = 0; j < num_zones; j++)
       {

/* calculate radial height for zone */
20     r = sqrt((zone[j].center.x * zone[j].center.x) +   'continued next line'
          (zone[j].center.y * zone[j].center.y) + (zone[j].center.z * zone[j].center.z));

/* determine min and max zone heights */
       min_zone_ht = r - ZONE_THICKNESS/2;
25     max_zone_ht = r + ZONE_THICKNESS/2;

/* store number of vectors, min/max hts and type in new file */
       fprintf(zfile,"%d\n",zone[j].zone_id);
       fprintf(zfile,"%d\n",zone[j].zone_type);
30     fprintf(zfile,"%d\n",zone[j].num_lines);
       fprintf(zfile,"%.1f %.1f\n",min_zone_ht,max_zone_ht);

/* determine normal vector to planes formed by vector pairs */
       for (i = 0; i < zone[j].num_lines; i++)
```

```
        {
        next_point = i + 1;
        if (next_point >= zone[j].num_lines)
          next_point = 0;
5       /* calculate cross product */ normal_vec.x = zone[j].p[i].y * zone[j].p[next_point].z - zone[j].p[i].z * zone[j].p[next_point].y;
        normal_vec.y = zone[j].p[i].z * zone[j].p[next_point].x - zone[j].p[i].x * zone[j].p[next_point].z;
        normal_vec.z = zone[j].p[i].x * zone[j].p[next_point].y - zone[j].p[i].y * zone[j].p[next_point].x;
10

/* save normal vectors to file */
        fprintf(zfile,"%.1f %.1f %.1f\n",normal_vec.x,normal_vec.y,normal_vec.z);
        } /* for each line in zone (i) */
      } /* for each zone (j) */
15    }
      double delta_lat; /* conversion error for lat ecef, required for cnvtcord*/

20    /*************************** MAIN ROUTINE ******************************/
      main()
      { char newzone_file[15];      /* name of file used to store converted zones */
25
        coord_type = 3;             /* hard coded to nhsp feet */ strcpy(coord_file,"coord.dat");  /* name of file containing coord data*/

30      _clearscreen(_GCLEARSCREEN);
        _settextposition(5,5);
        printf("Enter name of file containing NH state plane zone data : ");
        gets(zone_file);

35      _settextposition(7,5);
        printf("Enter name of file used to store converted zone data   : ");
        gets(newzone_file);
        if ((zfile = fopen(newzone_file,"w")) != NULL)
        {
40        read_zonefile();
          get_min_max();
```

```
    read_coord_data();
    convert_zone();
    calc_normal_vectors();
  }
}
```

SAMPLE PROGRAM #2:

```
/************************************************************************
File Name   : chkzone.c Description : chkzone.c contains the procedures used check the
              defined zones for incursions.

Units       : get_zones,
              chk_zones

*************************************************************************/ include <stdio.h>          /* standard input/output      */
include <graph.h>          /* MSC graphics routines      */
#include <string.h>         /* MSC string routines        */
#include <stdlib.h>         /* MSC standard library       */
#include <math.h>           /* MSC math library           */
#include "sio.h"            /* serial input/output        */
#include "coord.h"          /* coordinate definitions     */
#include "veh.h"            /* vehicle parameters         */
#include "rtzones.h"        /* zone definitions           */
#include "lights.h"         /* airport light definitions  */
/*#include "txlib.h" */     /* tx library functions       */ define START_FREQ 750      /* frequency of speaker tone 1 */
define END_FREQ 1000       /* frequency of speaker tone 2 */

/*------------------- external variables -------------------------------*/
extern short coord_type;    /* coordinate system for zone     */
extern char zone_file[15];  /* name of file containing zones  */
extern short veh_type;      /* type of vehicle                */
```

```
     extern short gpsvch_type;       /* type of vehicle configuration     */
     extern char veh_id[8];          /* id of current vehicle             */
     extern short layer;             /* layer id - for graphics display   */
     extern short min_warning;       /* min secs prior to issuing zone alert*/
5    extern int rwy_incursion;       /* indicates previous runway incursion */
     extern int zone_incursion;      /* indicates previous zone incursion */
     extern short current_clearance; /* set if any vehicle is cleared */
     extern char veh_cleared[8];     /* vehicle cleared for landing/takeoff */
     extern short veh_clear_status;  /* status for curr vehicle           */
10   extern short current_clearance; /* set if any vehicle is cleared */
     extern short veh_in_zone;       /* set if cleared veh in zone   */
     extern double max_proj_time;    /* max number of secs in projection */
     extern int prev_rwyincur;       /* indicates previous runway incursion
     */
15   /*----------------- global definitions -----------------------------*/
     short out_of_curr_zone=FALSE;   /* flag indicating pp is outside of zone */
     short inside_zone=FALSE;        /* flag indicating pp is outside of zone */
     int num_zones;                  /* total number of zones entered      */
     short zone_id;                  /* if of zone being incurred          */
20   short zone_ok;                  /* indicates veh cleared for runway zone */
     short zone_spkr_on;             /* flag indicating zone speaker on/off */
     ZONE_AREA zone[MAX_ZONES];      /* zone data structure                */
     /*------------------------------------------------------------------
     UNIT:  get_zones()
25

DESCRIPTION: get_zones reads the file containing the converted zone
                  data. As each zoned area is read, its values are stored
                  in the zone record structure.
30   ------------------------------------------------------------------*/
     get_zones()
     {
       FILE *zonefile;               /* file containting zoned area information */
       short i = 0;                  /* index into array of zoned areas    */
```

```
         short j;                  /* index into array of points    */
         char *token;              /* field read in from file string */
         char data_str[80];        /* line read from file           */

5    if ((zonefile = fopen(zone_file,"r")) != NULL)
     {
       while ((feof(zonefile) == 0) && (i < MAX_ZONES))
       {
         if (fgets(data_str,MAX_STR-1,zonefile) != NULL)
10       {
           zone[i].zone_id = atoi(data_str);           /* zone id           */
           fgets(data_str,MAX_STR-1,zonefile);         /* zone type         */
           zone[i].zone_type = atoi(data_str);
           fgets(data_str,MAX_STR-1,zonefile);         /* number of zone points */
15         zone[i].num_lines = atoi(data_str);

fgets(data_str,MAX_STR-1,zonefile);         /* min, max radial height */
           token = strtok(data_str," ");
           zone[i].ralt_min = atof(token);
20         token = strtok(NULL," ");
           zone[i].ralt_max = atof(token);

for (j = 0; j < zone[i].num_lines; j++)
           {
25           fgets(data_str,MAX_STR-1,zonefile);   /* point (x,y) */
             token = strtok(data_str," ");
             zone[i].p[j].x = atof(token);
             token = strtok(NULL," ");
             zone[i].p[j].y = atof(token);
30           token = strtok(NULL," ");
             zone[i].p[j].z = atof(token);
           } i++;
```

```
            }
          } /* while feof */
          num_zones = i;
          fclose(zonefile);
 5      }
        else
        {
          _clearscreen(_GCLEARSCREEN);
          _settextposition(10,10);
10        printf("No zone datafile entered. Function not enabled. Press ENTER.");
          getch();
        }
      }
      int rw_id;  /* id of runway for cleared vehicle */
15    /*-----------------------------------------------------------
        UNIT:            chk_arr_dep_zone()

DESCRIPTION:  chk_arr_dep_zone checks the zone incurred
                         to see if it is currently cleared for an arrival
20                       or departure. If it is and the vehicle has exited
                         the runway, the arrival/departure lights are cleared.

INPUTS:    j - current zone

25    -----------------------------------------------------------*/
      chk_arr_dep_zone(short j)
      {
        if (strcmpi(veh_cleared,veh_id) == 0)
        {
30        switch (j)
          {
            case RNWY_35_ZONE :
              if ((veh_clear_status == TAKEOFF_35) ||
                  (veh_clear_status == LANDING_35) ||
```

```
                                     35

(veh_clear_status == LANDING_17) ||
           (veh_clear_status == TAKEOFF_17))
        {
          current_clearance = current_clearance - veh_clear_status;
5         veh_clear_status = 0;
          update_lights(NO_ACTIVITY,RNWY_35);
        }
        break;

10      case RNWY_17_ZONE :
          if ((veh_clear_status == TAKEOFF_17) ||
            (veh_clear_status == LANDING_17) ||
            (veh_clear_status == LANDING_35) ||
            (veh_clear_status == TAKEOFF_35))
15        {
          current_clearance = current_clearance - veh_clear_status;
          veh_clear_status = 0;
          update_lights(NO_ACTIVITY,RNWY_17);
        }
20      break;
        case RNWY_24_ZONE :
          if ((veh_clear_status == TAKEOFF_24) ||
            (veh_clear_status == LANDING_24) ||
            (veh_clear_status == LANDING_06) ||
25          (veh_clear_status == TAKEOFF_06))
        {
          current_clearance = current_clearance - veh_clear_status;
          veh_clear_status = 0;
          update_lights(NO_ACTIVITY,RNWY_24);
30      }
        break;

case RNWY_06_ZONE :
          if ((veh_clear_status == TAKEOFF_06) ||
```

```
           (veh_clear_status == LANDING_06) ||
           (veh_clear_status == LANDING_24) ||
           (veh_clear_status == TAKEOFF_24))
        {
          current_clearance = current_clearance - veh_clear_status;
          veh_clear_status = 0;
          update_lights(NO_ACTIVITY,RNWY_06);
        }
        break;

case RNWY_INT_ZONE :
          if ((veh_clear_status == TAKEOFF_06) ||
           (veh_clear_status == LANDING_06) ||
           (veh_clear_status == TAKEOFF_17) ||
           (veh_clear_status == LANDING_17) ||
           (veh_clear_status == TAKEOFF_35) ||
           (veh_clear_status == LANDING_35) ||
           (veh_clear_status == LANDING_24) ||
           (veh_clear_status == TAKEOFF_24))
        {
          current_clearance = current_clearance - veh_clear_status;
          veh_clear_status = 0;
          update_lights(NO_ACTIVITY,RNWY_INT);
        }
        break;
      }
     }
    }
/*----------------------------------------------------------
UNIT:               chk_rnwy_zone()

DESCRIPTION:  chk_rnwy_zone checks the zone (about to be) incurred
              to see if it is a runway zone. If it is, a further
              check is performed to see if the vehicle is cleared
```

```
                                        for that zone.

INPUTS     j - current zone

5       ---------------------------------------------------------------*/
        chk_rnwy_zone(short j)
        {
           /* if the current vehicle has been cleared for runway access */
           if (veh_clear_status != 0)
10         {
              zone_ok = TRUE;
              inside_zone = FALSE;
              /* determine if cleared runway is the current zone */
              switch (j)
15            {
                case RNWY_35_ZONE :
                  if ((veh_clear_status == TAKEOFF_35))
                  {
                    veh_in_zone = TRUE;
20                  update_clearance_lights(veh_clear_status);
                  }
                  rw_id = RNWY_35_ZONE;
                break;

25              case RNWY_17_ZONE :
                  if ((veh_clear_status == TAKEOFF_17))
                  {
                    veh_in_zone = TRUE;
                    update_clearance_lights(veh_clear_status);
30                }
                  rw_id = RNWY_17_ZONE;
                break;

case RNWY_24_ZONE :
```

38

```
            if ((veh_clear_status == TAKEOFF_24))
            {
              veh_in_zone = TRUE;
              update_clearance_lights(veh_clear_status);
5           }
            rw_id = RNWY_24_ZONE;
          break;

case RNWY_06_ZONE :
10          if ((veh_clear_status == TAKEOFF_06))
            {
              veh_in_zone = TRUE;
              update_clearance_lights(veh_clear_status);
            }
15          rw_id = RNWY_06_ZONE;
          break;

case RNWY_INT_ZONE :
            if (veh_clear_status != 0)
20          {
              veh_in_zone = TRUE;
            }
            rw_id = RNWY_INT_ZONE;
          break;
25        }
        }
        if (zone_ok == FALSE)
        {
          /* runway incursion condition */
30        if (gpsveh_type == ATC)
          {
            switch (j)
            {
              case RNWY_35_ZONE : case RNWY_17_ZONE :
```

39

```
            rnwy_incursion = RNWY_35;
            break;

case RNWY_24_ZONE : case RNWY_06_ZONE :
 5            rnwy_incursion = RNWY_24;
            break;

case RNWY_INT_ZONE :
              rnwy_incursion = RNWY_INT;
10          break;
          }
        }
      }
    }
15  /*----------------------------------------------------------------
    UNIT:              chk_zone()

DESCRIPTION: chk_zone compares the current position (pp) with each stored zone.
    INPUTS:    *pp - pointer to present position
20             j  - current zone ----------------------------------------------------------------*/
    chk_zone(POINT *npp, short j)
    {
25    double rpp;                    /* radial height of present position (npp) */
      double dotp[MAX_POINTS];       /* dot product of npp and normal vectors   */
      short i=0;                     /* loop counter - normal vector in zone   */

/* check if zone is appropriate for the current vehicle type */
30    if (zone[j].zone_type & veh_type)
      {

/* calculate radial height of present position */
        rpp = sqrt((npp->x * npp->x) + (npp->y * npp->y) + (npp->z * npp->z));
```

```
    /* perform height check, if npp is within zone's min and max radial height, perform further
    checks */
        if ((rpp >= zone[j].ralt_min) && (rpp <= zone[j].ralt_max))
        {
            i = 0;
            /* calculate dot product of normal vectors and npp */
            while ((i < zone[j].num_lines) && (out_of_curr_zone == FALSE))
            {
                dotp[i] = zone[j].p[i].x * npp->x + zone[j].p[i].y * npp->y +   'continued next line'
                    zone[j].p[i].z * npp->z;

if (dotp[i] / fabs(dotp[i]) > 0)
                    out_of_curr_zone = TRUE;

i++;
            }
            if ((i == zone[j].num_lines) && (out_of_curr_zone == FALSE))
                inside_zone = TRUE;
        } /* if rpp */
    } /* if zone_type & veh_type */
}
/*-------------------------------------------------------------
UNIT:               chk_all_zones()

DESCRIPTION:    chk_all_zones compares the current position (pp) with each stored zone.

INPUTS:     *pp - pointer to present position
-------------------------------------------------------------*/
chk_all_zones(POINT *pp)
{
    POINT projp;                /* projected position            */
    char msg_buf[80];           /* zone incursion message        */
    short sound_alarm=FALSE;    /* flag indicating zone speaker on/off */
```

41

```
       unsigned freq = START_FREQ;        /* frequency of tone used to sound alarm */
       short zone_incurs_time;            /* time (in secs) incursion will occur   */
       short j=0;                         /* loop counter - current zone           */
       short i=0;

5
       inside_zone = FALSE;               /* flag indicating pp is outside of zone */
       zone_incurs_time = 99;
       zone_spkr_on = FALSE;

10     while ((j < num_zones) && (inside_zone == FALSE))  /* check each zone */
       { i = 0;
         while ((i < max_proj_time) && (inside_zone == FALSE))
15       {
           out_of_curr_zone = FALSE;  /* flag indicating pp is outside of zone */

/* project current position ahead from 0 to max_proj_time seconds */
           projp.x = pp->x + pp->x_vel * i;
20         projp.y = pp->y + pp->y_vel * i;
           projp.z = pp->z + pp->z_vel * i;

/* see if projected position is within zone */
           chk_zone(&projp,j);
25         zone_id = j;
           i++;
         }
         j++;
       } /* while j */
30
       if (inside_zone == TRUE) /*******************************************/
       {
         zone_ok = FALSE;
```

42

```
       /* check for valid/invalid entry onto runway */
       if ((j-1) < NO_RNWY)
         chk_rnwy_zone(j-1);
       else
 5       rnwy_incursion = NO_RNWY;

if (zone_ok == FALSE) /* process zone/runway incursion */
       {
         zone_incursion = j;
10
         /* set layer */
         if (i <= min_warning)
         {
           layer = WARNING_LAYER;
15         if (gpsveh_type == ATC)
           {
             sprintf(msg_buf,"ZONE INCURSION WARNING, VEHICLE %s",veh_id);
             ATC_Window(msg_buf,2);
           }
20       }
         else
         {
           layer = WATCH_LAYER;
           if (gpsveh_type == ATC)
25         {
             sprintf(msg_buf,"ZONE INCURSION WATCH, VEHICLE %s ",veh_id);
             ATC_Window(msg_buf,2);
           }
         }
30
         /* sound tones only if processing on board vehicle, none for ATC */
         if (gpsveh_type != ATC)
         {
           /* pp is inside zone, sound tone and change layer */
```

43

```
            zone_spkr_on = TRUE;
            if (freq == START_FREQ)
              freq = END_FREQ;
            else
 5            freq = START_FREQ;
            spkr_on(freq);
          } if (rw_id != NO_RNWY)
10        {
            chk_arr_dep_zone(rw_id);
            rw_id = NO_RNWY;
          }

15      } /* if zone_ok */
        else /* inside zone but cleared */
        {
          layer = set_default_layer();  /* reset layer info */
          if ((gpsveh_type == ATC) && (zone_incursion != 0))
20        { sprintf(msg_buf,"                                    'continued next line'
      ");
            ATC_Window(msg_buf,2);
25          zone_incursion = 0;
          }
        }
      } /* inside zone */

30    else /* not inside zone ***********************************************/
      {
        spkr_off();  /* turn off audible alarm */
        zone_spkr_on = FALSE;
        layer = set_default_layer();  /* reset layer info */
```

```
    if (gpsvch_type == ATC)
    {
      if (zone_incursion != 0)
      { sprintf(msg_buf,"                              'continued next line'
");
        ATC_Window(msg_buf,2);
        zone_incursion = 0;
      }
      /* if a runway incursion was currently active */
      if (rwy_incursion != NO_RNWY)
      {
        rwy_incursion = NO_RNWY;
      }
   /*    if (veh_in_zone == TRUE)*/
      if (rw_id != NO_RNWY)
      {
        chk_arr_dep_zone(rw_id);
        rw_id = NO_RNWY;
      }
     }
    }
   }
```

SAMPLE PROGRAM #3:

The following is representative source code for State Plane coordinate 2-D zone processing with tone alerts when a zone is violated, note: no projections are provided.

/*************************************************************************

File Name  : zones.c

Description : zones.c contains the procedures used to process the
              forbidden zones defined in the user specified file.
              When a zone is entered, an audible tone is sounded.

```
Units    read_zonefile,
         get_min_max,
         check_line,
         check_actual_zone,
         check_rough_zone
*****************************************************************/ include <stdio.h>          /* standard input/output          */
include <graph.h>          /* MSC graphics routines          */
#include <string.h>         /* MSC string routines            */
#include <stdlib.h>         /* MSC standard library           */
#include "coord.h"          /* coordinate conversion factors */
#include "sio.h"            /* serial input/output            */
#include "zones.h"          /* zone structure definition      */

/*------------------ global definitions -----------------------------*/
#define IN_ZONE 1           /* current position is inside zone */
#define OUTSIDE_ZONE 0      /* current position is outside zone */

/*------------------ external variables -----------------------------*/
extern SPCS sp_coord;       /* sp x,y coordinates             */
extern short no_zones;      /* flag - no zone area processing */
extern char cmd_str[81];    /* string containing keyboard entries */
extern char zone_file[15];  /* name of file with stored zone data */

/*------------------ global data -----------------------------------*/
int num_zones;                          /* total number of zones entered */
ZONE_AREA zone[MAX_ZONES];              /* zone definition data structure */
short zone_spkr_on = FALSE;             /* flag indicating speaker is enabled */
short exit_zones = FALSE;               /* flag - zone checking should continue */

/*-----------------------------------------------------------------
UNIT:  read_zonefile()
```

DESCRIPTION: read_zonfile opens and reads the zone.dat file. As
each zoned area is read, its values are stored in the
zone record structure (see zone.h). The total number
of zones is stored in the num_zones variable. If no
zone.dat file is found, the no_zones global flag is set
to TRUE to avoid the zone area processing.
------------------------------------------------------------------*/

```c
read_zonefile()
{
    FILE *zonefile;         /* file containting zoned area information */
    short i = 0;            /* index into array of zoned areas         */
    short j;                /* index into array of points              */
    short num_points;       /* number of points for a zoned area       */
    char *token;            /* field read in from file string          */
    char data_str[80];      /* line read from file                     */ if ((zonefile = fopen(zone_file,"r")) != NULL)
    {
    while ((feof(zonefile) == 0) && (i < MAX_ZONES))
    {
        /* read next line in zone datafile, store data in data_str */
        if (fgets(data_str,MAX_STR-1,zonefile) != NULL)
        {
        fgets(data_str,MAX_STR-1,zonefile);  /* # of points in area */
        zone[i].num_lines = atoi(data_str);

for (j = 0; j < zone[i].num_lines; j++)
        {
            fgets(data_str,MAX_STR-1,zonefile);  /* point (x,y) */
            token = strtok(data_str," ");
            zone[i].p[j].x = atof(token);
            token = strtok(NULL," ");
            zone[i].p[j].y = atof(token);
        }
```

47

```
        fgets(data_str,MAX_STR-1,zonefile);  /* type of zone, ignore */
        zone[i].zone_type = data_str[0];

/* store 1st point again as last point to close the area */
 5      zone[i].num_lines++;  /* increment by one to close the area */
        zone[i].p[j].x = zone[i].p[0].x;
        zone[i].p[j].y = zone[i].p[0].y;

i++;
10    }  /* if fgets */
    }  /* while feof */
    num_zones = i;
  }
  else
15  {
      _clearscreen(_GCLEARSCREEN);
      _settextposition(10,10);
      printf("No zone datafile entered. Function not enabled. Press ENTER.");
      getch();
20    no_zones = TRUE;
  }
  strcpy(cmd_str,'\0');
}

25
  /*-----------------------------------------------------------
    UNIT:   get_min_max()

DESCRIPTION: get_min_max determines the min and max values for the
30                 x and y coordinates of the zoned area. The values
                   are determined by comparing each x and y value stored
                   in the zone record structure. The min and max values
                   are then stored in the zone record.
  -----------------------------------------------------------*/
```

48

```
     get_min_max()
     {
     /* temporary storage values for min, max values */
     double max_x;
5    double max_y;
     double min_x;
     double min_y;

short j,i;   /* counter */
10   for (j = 0; j < num_zones; j++)
     {
       min_x = zone[j].p[0].x;
       max_x = zone[j].p[0].x;
       min_y = zone[j].p[0].y;
15     max_y = zone[j].p[0].y;

for (i = 1; i < zone[j].num_lines; i++)
       {
        if (zone[j].p[i].x > max_x)
20         max_x = zone[j].p[i].x;
        if (zone[j].p[i].x < min_x)
           min_x = zone[j].p[i].x;
        if (zone[j].p[i].y > max_y)
           max_y = zone[j].p[i].y;
25      if (zone[j].p[i].y < min_y)
           min_y = zone[j].p[i].y;
       } /* for i */ zone[j].max.x = max_x;
30     zone[j].max.y = max_y;
       zone[j].min.x = min_x;
       zone[j].min.y = min_y;

} /* for j */
```

```
     double m;                 /* slope of line p1 p2              */
     double intx, inty;        /* intersection point of the 2 equations  */
5    double offx, offy;        /* offset from pres posn to the line p1 p2 */

/*-------------------------------------------------------------
     UNIT:     check_line()

10
     DESCRIPTION:  check_line determines the offset from the present
                   position to the line between p1 (x1,y1) and p2 (x2,y2).

INPUTS:    x1, y1, x2, y2  points for start and end of line
15   -------------------------------------------------------------*/
     check_line(double x1, double y1, double x2, double y2)
     {
     double run;               /* used to determine slope of line        */
     double beqn;              /* determine eqn for line p1 p2           */
20   double mnormal;           /* slope of line from pres. posn to normal point */
     double bnorm,bnormal;     /* eqn of line from pres. posn to normal point   */
     double div_val;           /* used during division operation         */

/* calculate the slope of the line */
25   run = x2 - x1;
     if (run == 0)
        run = 0.00000000000001;
     m = (y2 - y1) / run;

30   if (m == 0)
        m = 0.000000000000000000001;

/* calculate slope of line from present position to the normal point on line p1 p2 */
```

```
       mnormal = -(1/m);

/* determine the equation for the line between p1 and p2 */
       beqn = y1 - m * x1;
 5
       /* determine the equation for the line between the present position
       and the normal point on p1 p2 */ bnorm = mnormal * sp_coord.longitude;
10     bnormal = sp_coord.latitude - bnorm;

/* determine the intersection of both lines */
       div_val = m - mnormal;
       if (div_val == 0)
15        div_val = 0.00001;
       intx = (bnormal - beqn) / div_val;
       inty = mnormal * intx + bnormal;

/* determine the offset from the present posn to the line between p1 p2 */
20     offx = sp_coord.longitude - intx;
       offy = sp_coord.latitude - inty;
       }
       #define START_FREQ 750  /* frequency of speaker tone 1 */
       #define END_FREQ 1000   /* frequency of speaker tone 2 */
25     /*--------------------------------------------------------------
       UNIT:        check_actual_zone DESCRIPTION: check_actual_zone uses the min and max values for
                    the line points and the offset calculated by check_line
30                  to determine if the current point is inside or outside
                    the line. If the point is inside the line, the next
                    line is checked. If the point is inside all the lines,
                    it is considered inside the zone and the audible tone
                    is sounded.
```

51

```
                                                           -------*/
   unsigned freq = START_FREQ;   /* frequency of tone used to sound alarm */
   short check_actual_zone(short id)
   {
5
     double minx, maxx, miny, maxy;  /* min & max values for line points */
     short i = 0;                    /* index into point array */ while (i < zone[id].num_lines-1)
10   {
        check_line(zone[id].p[i].x,zone[id].p[i].y,zone[id].p[i+1].x,zone[id].p[i+1].y);

minx = min(zone[id].p[i].x,zone[id].p[i+1].x);
        maxx = max(zone[id].p[i].x,zone[id].p[i+1].x);
15      miny = min(zone[id].p[i].y,zone[id].p[i+1].y);
        maxy = max(zone[id].p[i].y,zone[id].p[i+1].y);

switch (i)
        {
20      case 0 :
           /* determine which side of the line the pres posn is on for first 2 line segments */
           if (m >= 0)
           {
             if ((minx <= intx) && (intx <= maxx) &&
25             (miny <= inty) && (inty <= maxy))
             { if ((offx >= 0) && (offy <= 0))
                 ; /* no action, fall thru loop and check next point */
30             else
                 return(OUTSIDE_ZONE);
             } /* if */
           } /* if */
           else /* m < 0 */
```

52

```
       { if ((minx <= intx) && (intx <= maxx) &&
           (miny <= inty) && (inty <= maxy))
 5     {
         if ((offx >= 0) && (offy >= 0))
           ; /* no action, fall thru loop and check next point */
         else
           return(OUTSIDE_ZONE);
10     } /* if */
       } /* else */
       break;
       case 1 :
       /* determine which side of the line the pres posn is on for first 2 line segments */
15     if (m >= 0)
       {
         if ((minx <= intx) && (intx <= maxx) &&
             (miny <= inty) && (inty <= maxy))
         {
20         if ((offx >= 0) && (offy <= 0))
             ; /* no action, fall thru loop and check next point */
           else
             return(OUTSIDE_ZONE);
         } /* if */
25     } /* if */
       else   /* m < 0 */
       {
         if ((minx <= intx) && (intx <= maxx) &&
             (miny <= inty) && (inty <= maxy))
30       {
           if ((offx <= 0) && (offy <= 0))
             ; /* no action, fall thru loop and check next point */
           else
             return(OUTSIDE_ZONE);
```

53

```
        } /* if */
       } /* else */
      break;

5    case 2 :
      /* determine which side of the line the pres posn is on for third line segment */
      if (m >= 0)
      {
       if ((minx <= intx) && (intx <= maxx) &&
10        (miny <= inty) && (inty <= maxy))
       {
        if ((offx <= 0) && (offy >= 0))
          ; /* no action, fall thru loop and check next point */
        else
15        return(OUTSIDE_ZONE);
       } /* if */
      } /* if */
      else   /* m < 0 */
      {
20     if ((minx <= intx) && (intx <= maxx) &&
          (miny <= inty) && (inty <= maxy))
       {
        if ((offx <= 0) && (offy <= 0))
          ; /* no action, fall thru loop and check next point */
25      else
          return(OUTSIDE_ZONE);
       } /* if */
      } /* else */
      break;
30
      case 3 :
      /* determine which side of the line the pres posn is on for fourth line segment */
      if (m >= 0)
      {
```

```
            if ((offx <= 0) && (offy >= 0))
              {
               zone_spkr_on = TRUE;
               if (freq == START_FREQ)
                 freq = END_FREQ;
               else
                 freq = START_FREQ;
               spkr_on(freq);
               return(IN_ZONE);
              }
            else
              return(OUTSIDE_ZONE);
          } /* if */
          else   /* m < 0 */
          {
            if ((offx >= 0) && (offy >= 0))
              {
               zone_spkr_on = TRUE;
               if (freq == START_FREQ)
                 freq = END_FREQ;
               else
                 freq = START_FREQ;
               spkr_on(freq);
               return(IN_ZONE);
              }
            else
              return(OUTSIDE_ZONE);
          } /* else */
        break;

} /* switch */ i++;  /* increment to test next line segment */
    } /* while */
```

Since the extension to polygons of N sides based upon the previous concepts are easily understood, the derivation has been omitted for the sake of brevity.

In summary two mathematical methods are identified for detecting zone incursions into convex polygons, one based on the equation and slope of the lines, the other is based on vector cross and dot product operators.

The concept of zones, regardless as to whether they are referenced to surface coordinates, local grid systems or ECEF coordinates, provide a powerful analytical method for use in the Airport Control and Management System.

ZONE BASED CLEARANCES

The airport control and management system manages overall taxi, departure and arrival clearances in a unique and novel manner through the use of zone processing. A departure ground taxi clearance is issued to the selected vehicle. The waypoints and travel path are drawn into the map aboard the selected vehicle. The vehicle(s) then use the presented taxi information to proceed to the final waypoint. AC&M processing uses this clearance information to mask runway zone incursions along the travel path. Since runway incursions are masked for only the selected vehicle and for zones traversed no runway incursion alert actions or warning lights are produced when following the proper course. Should the position represent movement outside of the established corridor, an alert is issued signifying an off course condition exist for that vehicle. Upon the vehicle exit from a particular "cleared" zone, the mask is reset for that zone. Once the last waypoint is reached the clearance is removed and the zone mask is reset. The description below details how such clearances are managed.

SURFACE DEPARTURE CLEARANCE MANAGEMENT METHOD

Figure 8:
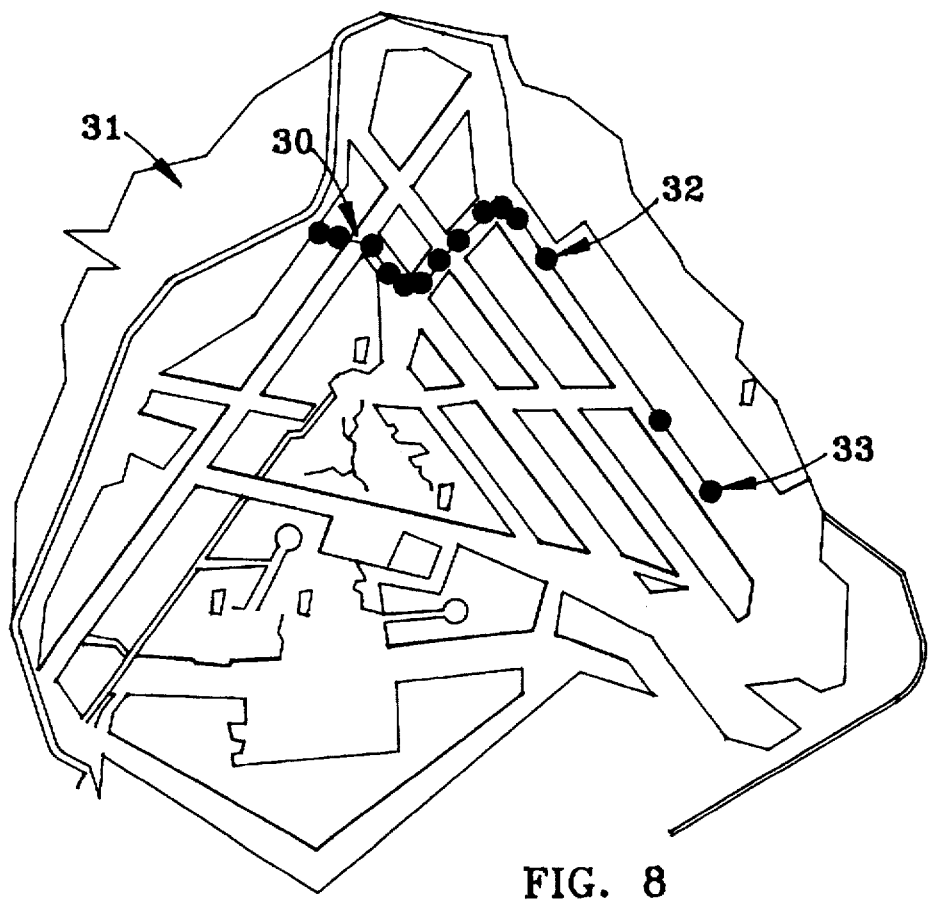
FIG. 8 shows a map display with surface waypoints and travel path

1. The operator or controller wishes to issue a surface departure clearance to a specific vehicle.
2. Through the use of a data entry device such as a touch screen or keyboard or mouse, issue waypoints command is selected for surface departure waypoints
3. The operator is asked to select a specific vehicle from a list of available aircraft and vehicles
4. The vehicle data window then displays a scrollable list of available vehicles contained in a database which are capable of performing operations of departure clearance
5. The operator then selects the specific vehicle using a data entry device such as a touch screen or other data entry device
6. A list is then displayed in a scrollable graphical window of available departure travel paths for the selected vehicle
7. The operator then selects from this list using a data entry device such as a touch screen or other data entry device
8. Upon selection of a particular departure path the waypoints and travel path are drawn into a 3-D ALP. The purpose of presentation is to show the controller or operator the actual path selected
9. The controller or operator is then asked to confirm the selected path. Is the selected path correct? Using a data entry device such as a touch screen or other data entry device a selection is made
10. If the selected path was not correct, then the command is terminated and no further action is taken
11. If the selection was correct the following steps are taken automatically.
    a. AC&M processing sends to the selected vehicle using a radio duplex datalink, the clearance, 4-D waypoint and travel path information
    b. The selected vehicle upon receipt of the ATC command replies with an acknowledgment. The acknowledgment is sent over the full duplex radio datalink to the AC&M processing
    c. Should the AC&M processing not receive the acknowledgment in a specified amount of time from the selected vehicle, a re-transmission occurs up to a maximum of N re-transmissions
    d. The vehicle upon receiving the ATC command then "loads" the 4-D navigator with the 4-D waypoint information. A map display contained in the vehicle then draws into the 3-D ALP the departure travel path as shown in FIG. 8. This figure shows travel path as 30 in the digital ALP 31 while actual waypoints are shown as (14) spheres 32.

DEPARTURE CLEARANCE MANAGEMENT METHOD

Figure 9:
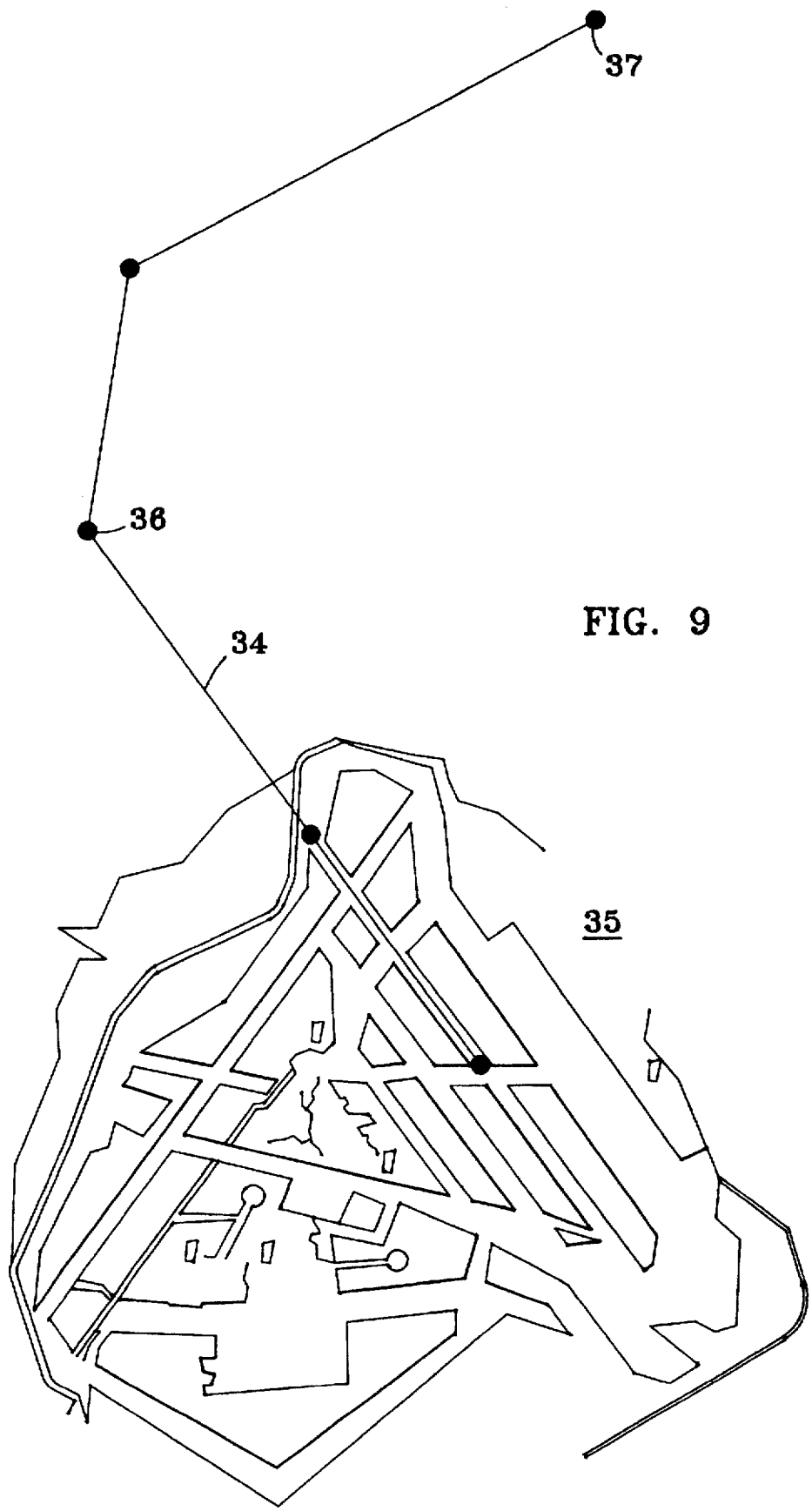
FIG. 9 shows a map display with departure waypoints and travel path.

1. The operator or controller wishes to issue a departure clearance to a specific aircraft
2. Through the use of a data entry device such as a touch screen or keyboard or mouse, issue waypoints command is selected for departure waypoints
3. The operator is asked to select a specific vehicle from a list of available aircraft
4. The vehicle data window then displays a scrollable list of available aircraft contained in a database which are capable of performing operations of departure clearance
5. The operator then selects the specific vehicle using a data entry device such as a touch screen or other data entry device
6. A list is then displayed in a scrollable graphical window of available departure travel paths for the selected vehicle
7. The operator then selects from this list using a data entry device such as a touch screen or other data entry device
8. Upon selection of a particular departure path the waypoints and travel path are drawn into a 3-D ALP. The purpose of presentation is to show the controller or operator the actual path selected
9. The controller or operator is then asked to confirm the selected path. Is the selected path correct? Using a data entry device such as a touch screen or other data entry device a selection is made.
10. If the selected path was not correct, then the command is terminated and no further action is taken
11. If the selection was correct the following steps are taken automatically.
    a. AC&M processing sends to the selected vehicle using a radio duplex datalink, the clearance, 4-D waypoint and travel path information
    b. The selected vehicle upon receipt of the ATC command replies with an acknowledgment. The acknowledgment is sent over the full duplex radio datalink to the AC&M processing
    c. Should the AC&M processing not receive the acknowledgment in a specified amount of time from the selected vehicle, a re-transmission occurs up to a maximum of N re-transmissions
    d. The vehicle upon receiving the ATC command then "loads" the 4-D navigator with the 4-D waypoint information. A map display contained in the vehicle then draws into the 3-D ALP the departure travel path as shown in FIG. 9. This figure shows travel path as 34 in the digital ALP 35 while actual waypoints are shown as (5) spheres 36.

12. Upon AC&M receiving the acknowledgment, the following is performed:
    a. the zone mask is updated indicating that the selected vehicle has a clearance to occupy runway(s) and taxiway(s) along the travel path. This mask suppresses zone runway incursion logic for this vehicle.
    b. the zone based lighting control processing then activates the appropriate set of airport lights for the issued clearance in this case Take Off Lights
13. The vehicle now has active navigation information and may start to move, sending out ADS message broadcasts over the datalink to other vehicles and the AC&M system
14. The selected vehicle ADS messages are received at the AC&M system and at other vehicles.
15. AC&M processing using information contained in the ADS message performs mirrored navigational processing, as outlined in a latter section.
16. Zone incursion checking is performed for every received ADS message using position projection techniques for zones contained in the zones database
17. Should a zone incursion be detected, the zone mask is used to determine if the incurred zone is one which the vehicle is allowed to be in. If the zone is not in the zone mask then a warning is issued. Should the zone be that of a Runway, a Runway Incursion Alert is Issued and the appropriate airport lights are activated.
18. The ADS position is used to determine when the vehicle leaves a zone. When the vehicle leaves the zone, the clearance mask is updated indicating travel though a particular zone is complete. When this occurs the following steps are initiated by the AC&M:
    a. the zones mask is updated
    b. airport light status is updated If the exited zone was a Runway, operations may now occur on the exited runway 19. The vehicle continues to travel towards the final waypoint 37.
20. At the final waypoint the navigator and the map display are purged of active waypoint information, meaning the vehicle is where it is expected to be. New waypoints may be issued at any time with a waypoints command function.

AC&M zones based clearance function as presented here provides a unique and automated method for the controlling and managing airport surface and air clearances.

COLLISION DETECTION

Figure 10:
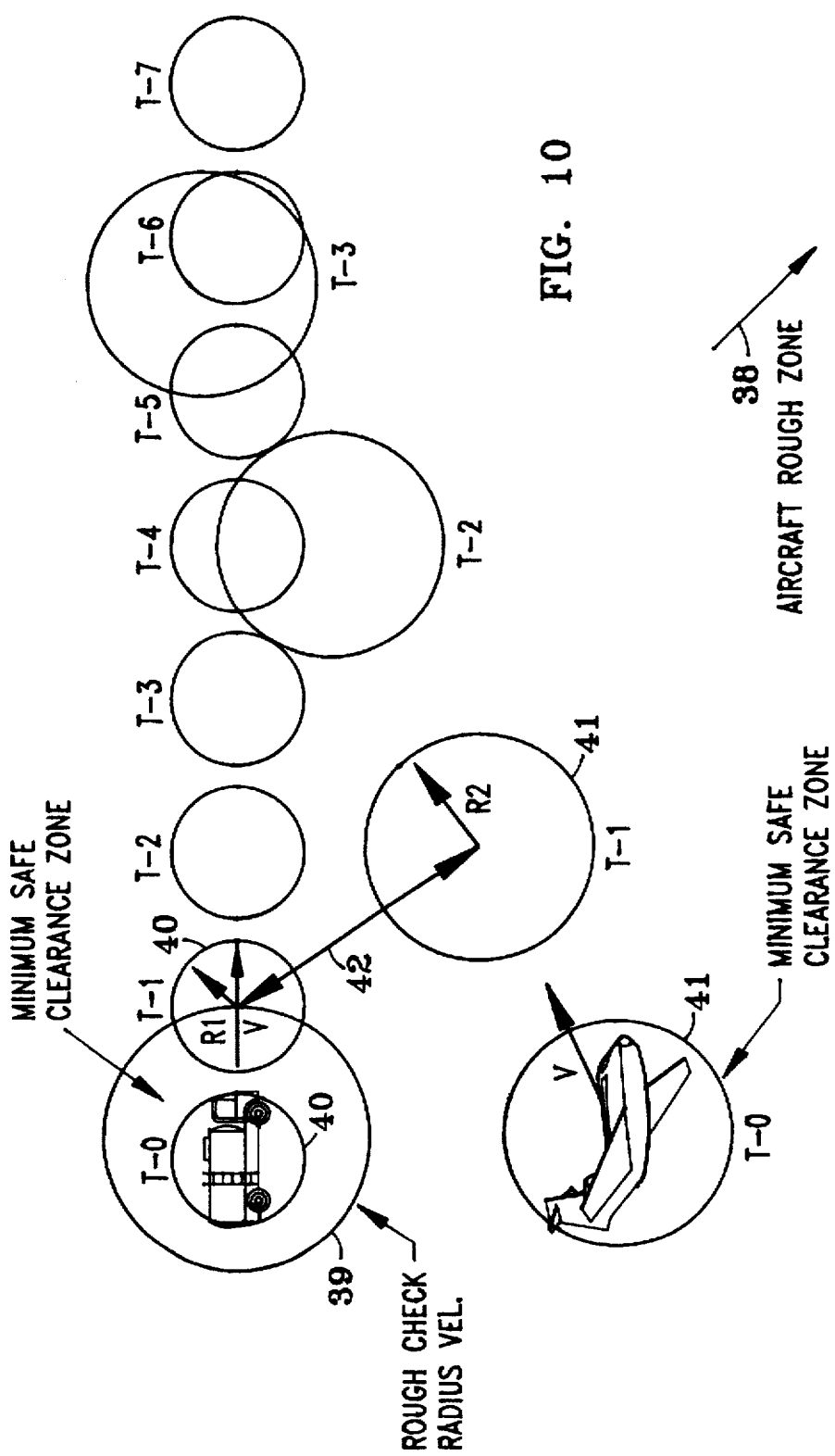
FIG. 10 illustrates the 4-D collision detection mechanism employed in the Airport Control and Management System.

Collision detection is performed through the zones management process. The basic steps for collision detection and avoidance are shown below in a general form. FIG. 10 shows graphically what the following text describes.

1. Vehicle Position, Velocity and Time (PVT) information are received for all tracked vehicles. The following processing is performed for each and every ADS vehicle report
2. PVT information is converted to the appropriate coordinate system if necessary and stored in the database
3. A rough check zone 38 and 39 is established based on the current velocity for each vehicle in the database
4. Every vehicle's rough check radius is compared with every other vehicle in the database. This is done simply by subtracting the current position of vehicle V from the position of vehicle V+1 in the database to determine the separation distance between each vehicle and every other vehicle in the database. This is performed in the ECEF coordinate frame.
5. For each pair of vehicles in the database that are within the sum of the two respective rough check radii values; continue further checking since a possible collision condition exists, if not within the sum of the rough check radii do no further processing until the next ADS message is received
6. For each set of vehicles which have intersecting rough check radii project the position ahead by an increment of Time (t) using the received vehicle velocity and optionally acceleration information. Projected positions at time=T1 are shown by two circles 40 and 41 the minimum safe clearance separation for the fuel truck R1 and aircraft R2 respectively.
7. Determine the new separation distance between all vehicles which initially required further checking. Compare this distance to the sum of minimum safe clearance distances R1 and R2 for those vehicles at the new incremented time. The minimum safe clearance distances R1 and R2 are contained in a database and is a function of vehicle velocity and type. Should the separation distance 42 between them be less than the sum of the minimal safe clearance distances R1+R2, then generate alert warning condition. Record the collision time values for each set of vehicles checked. If no minimum safe clearance distance is violated then continue checking the next set of vehicles in a similar fashion. When all vehicles pairs are checked then return to the start of the vehicle database.
8. Increment the projection time value (T+t) seconds and repeat step 7 if separation was greater than the sum of the minimal safe separation distance R1+R2. Continue to increment the time value to a maximum preset value, until the maximum projection time is reached, then process next pair of vehicles in a similar fashion, until the last vehicle is reached at that time start the process over. If minimum safe clearance (R1+R2) was violated compare the time of intersection to the previous time of intersection. If the previous intersection time is less than the new intersection time the vehicles are moving apart, no collision warning generated. In the event that the vehicles are moving together, meaning the intersection times are getting smaller, determine if a course change is expected based upon the current waypoints issued, and if the course change will eliminate the collision condition. If a course change is not expected or if the course change will not alleviate the collision situation then generate alert. If the projection lime T is less than the maximum projection time for warning alerts, generate a warning. If the projection time T is greater than the maximum projection time for a warning alert and less than the maximum projection time for a watch alert, generate a watch alert. If the projection time T is greater than the maximum projection time for a watch alert generate no watch alert.
9. The warning condition generates a message on the ALERT display identifying which vehicles are in a collision warning state. It also elevates the layer identifier code for those vehicle(s) to an always displayed (non-maskable) warning layer in which all potentially colliding vehicles are displayed in RED.
10. The watch condition generates a message on the ALERT display identifying which vehicles are in a collision watch state. It also elevates the layer identifier code for that vehicle(s) to an always displayed (non-maskable) watch layer in which all potentially colliding vehicles are displayed in YELLOW.

11. The process continually runs with each new ADS message report.

The sample code below performs the above collision processing, without the routine which checks for course changes, to reduce false alarms.

```
/*************************************************************************

File Name   : collpred.c

5    Description : collpred.c contains the routines which update the vehicle
                   database and perform collision prediction algorithms.

Units       : get_veh_index,
                   store_remote_msg,
10                 chk_for_collisions,
                   convert_veh /*-----------------------------------------------------------------*/
     #include <stdio.h>
15   #include <string.h>
     #include <stdlib.h>
     #include <graph.h>
     #include <math.h>
     #include "veh.h"
20   #include "sio.h"
     #include "coord.h"
     #include "color.h"
     #include "rtzones.h"
     #include "lights.h"
25   /*#include "txlib.h" */  /* tx library functions    */
     #define DEF_SEP 100000
     /*----------------- external procedures ---------------------------*/
     /*---- coordinate convertion routines ----*/
     /*extern POINT *convert_ecef_to_dd(POINT *pp);*/

30
     /*----------------- external variables ----------------------------*/
     extern short num_vehs;      /* number of vehicles in database  */
     extern char veh_id[8];      /* id of current vehicle           */
     extern short veh_type;      /* type of vehicle                 */
```

```
extern short gpsveh_type;           /* type of vehicle                        */
extern short veh_clear_status;      /* clearance status for vehicle           */
extern double cur_radius;           /* radius of present position for zones   */
extern short min_warning;           /* min secs prior to collision alert      */
extern short mid_warning;           /* mid range number of secs prior to alert*/
extern double proj_time;            /* time used in projection of position    */
extern short max_coll_count;        /* num coll detections prior to alert     */
extern short layer;                 /* graphics layer for vehicle             */
extern int rwy_incursion;           /* indicates previous runway incursion    */
extern int zone_incursion;          /* indicates previous zone incursion      */
extern double max_proj_time;        /* maximum number of seconds in projection*/
extern short inside_zone;           /* flag indicating pp is in static zone   */
extern short veh_update;            /* flag indicating new vehicle data       */
extern short vehnum;                /* vehicle number (based on id)           */
extern int total_wps[MAX_VEHS];     /* total waypoints in current wp list     */
extern short current_clearance;     /* set if any vehicle is cleared          */
extern short end_of_wps;            /* end of waypoint processing             */
extern short off_course;            /* flag indicating veh is off course      */
extern short wrong_way;             /* flag indicating veh is wrong way       */
extern double xtrack;               /* cross track error                      */
extern double range[MAX_VEHS];      /* range value stored for each vehicle*/
extern char veh_cleared[8];         /* vehicle cleared for landing/takeoff */
extern FILE *colfile;
/*short in_coll_zone;*/             /* flag indicating pp is outside of zone */ short curr_color;                   /* current color                          */
short coll_condition;               /* flag indicating coll watch/warning     */
int prev_rwyincur;                  /* indicates previous runway incursion    */
short prev_layer;                   /* graphics layer for vehicle             */
/*-------------------- global data --------------------------------*/
short vindex;                       /* index into vehicle database */
VEHICLE_DATA veh[MAX_VEHS];         /* vehicle database                       */
/*-----------------------------------------------------------------
Unit Name:          store_remote_veh
```

66

Description: parses the veh_str and stores the data in the vehicle database. The incoming veh_str has the following format :

veh_id veh_type ecefx ecefy ecefx velx vely velz course

This function is called by the vehicle processing
whenever a remote message is received. In the ATC
processor, collision prediction is performed each
time a remote message is received. After the
collision prediction processing, store_remote_veh
is called to update the vehicle database.

```
-----------------------------------------------------------*/
store_remote_veh(char veh_str[VEH_STR])
{
    char *token;        /* parsed field */

/* extract veh_id from veh_str, get index into vehicle databse */
    token = strtok(veh_str,",");
    token = strtok(NULL,",");

if (strcmpi(veh_id,token) != 0)  /* for rt-track, atc veh_id = 99 */
    {
    vindex = get_veh_index(token);

if (vindex != -1)
    {
     strcpy(veh[vindex].veh_id, token);

/* parse fields and store in vehicle database */
    token = strtok(NULL,",");
    veh[vindex].veh_type = atoi(token);
    if (veh[vindex].veh_type == 0)
       {
```

```
            if (strcmpi(veh[vindex].veh_id,"03") == 0)
                veh[vindex].veh_type = DEP_AIR;
            if (strcmpi(veh[vindex].veh_id,"04") == 0)
                veh[vindex].veh_type = FULL_GRND;
 5          if (strcmpi(veh[vindex].veh_id,"05") == 0)
                veh[vindex].veh_type = LIM_GRND;
        }
        /* set veh_type = to current vehicle's type for ATC */
        if (gpsveh_type == ATC)
10          veh_type = veh[vindex].veh_type;

token = strtok(NULL,",");
        veh[vindex].ecefx = atof(token)
        token = strtok(NULL,",");
15      veh[vindex].ecefy = -(atof(token)
        token = strtok(NULL,",");
        veh[vindex].ecefz = atof(token)
        token = strtok(NULL,",");
        veh[vindex].xvel = atof(token);
20      token = strtok(NULL,",");
        veh[vindex].yvel = atof(token);
        token = strtok(NULL,",");
        veh[vindex].zvel = atof(token);

25      /* project current position ahead by proj_time factor */
        veh[vindex].ecefx = veh[vindex].ecefx + veh[vindex].xvel * proj_time;
        veh[vindex].ecefy = veh[vindex].ecefy + veh[vindex].yvel * proj_time;
        veh[vindex].ecefz = veh[vindex].ecefz + veh[vindex].zvel * proj_time;

30      veh[vindex].radius = set_default_radius();

/* if adding vehicle to database for first time (layer is 0), initialize changeable settings */ if (veh[vindex].layer_id == 0)
```

```
        {
          veh[vindex].layer_id = set_default_layer();
          veh[vindex].prev_layer = veh[vindex].layer_id;
          veh[vindex].color = curr_color;
 5        veh[vindex].clear_status = 0;
          veh[vindex].rnwy_incurs = NO_RNWY;
          veh[vindex].zone_incurs = 0;
          veh[vindex].coll_cond = 0;
          veh[vindex].wrong_way = 0;
10        veh[vindex].pos_hold = 0;
          veh[vindex].coll_sep = DEF_SEP;
          veh[vindex].on_off_course = FALSE;
          veh[vindex].wpindex = NO_WP;
          veh[vindex].currwp = NO_WP;
15        veh[vindex].xtrack = 0;
          veh[vindex].range = 0;
        }
      }
    }
20 }
/*----------------------------------------------------------
   Unit Name:      chk_for_collisions Description:    Compares the current vehicle's position and velocity
25                 data with each vehicle in the database. Called by
                   vehicle processor each time a local GPS message is
                   received. Called by ATC processor when a remote
                   vehicle message is received. Requires global
                   variable veh_id.
30
   Inputs:         curr_veh, current vehicle. Set to projected
                   position for vehicle processing, most recent remote
                   vehicle message for ATC processing.
```

```
                Outputs
     /*---------------------------------------------------------------*/
                chk_for_collisions(POINT *cur_veh)
                {
 5              POINT_XYZ projp;         /* projected current position */
                POINT_XYZ projv;         /* projected vehicle position */
                char msg_buf[60];        /* collision message              */
                short num_secs=1;        /* number of seconds into collision checking */
                short coll_watch = FALSE; /* flag indicating collision watch condition */
10              double dr;               /* distance between cur_veh & veh      */
                double cr,vr;            /* radius of rough collision spheres   */
                int i,k;                 /* counter */
                unsigned freq;           /* alarm tone frequency           */
                short coll_warning = FALSE; /* indicates collision warning condition */
15              short no_warning=TRUE;   /* no warnings pending            */
                short no_watch=TRUE;     /* no watches pending             */
                int veh1,veh2;           /* vehicle ids           */
                short clear_msg;
                clear_msg = 0;
20              coll_condition = FALSE;
                /* project current position ahead max_proj_time seconds */
                projp.x = cur_veh->x + cur_veh->x_vel * max_proj_time;
                projp.y = cur_veh->y + cur_veh->y_vel * max_proj_time;
                projp.z = cur_veh->z + cur_veh->z_vel * max_proj_time;
25
                /* determine radius of sphere from cur_veh posn to projp */
                cr = sqrt(pow((projp.x - cur_veh->x),2)+pow((projp.y - cur_veh->y),2) +   'continued next line'
                    pow((projp.z - cur_veh->z),2));

30              /* if radius is < default radius, set it to the default value */
                if (cr < cur_radius)
                    cr = cur_radius;

for (i = 0; i < num_vehs; i++)
```

70

```
    {
        coll_watch = FALSE;
        coll_warning = FALSE;
        /* do not compare vehicle to itself */
5       if (strcmpi(veh_id,veh[i].veh_id) != 0)
        {
            veh1 = atoi(veh_id);
            veh2 = atoi(veh[i].veh_id);

10              /* project vehicle position ahead max_proj_time seconds */
            projv.x = veh[i].ecefx + veh[i].xvel * max_proj_time;
            projv.y = veh[i].ecefy + veh[i].yvel * max_proj_time;
            projv.z = veh[i].ecefz + veh[i].zvel * max_proj_time;

15          /* determine radius of sphere from veh posn to projp */
            vr = sqrt(pow((projv.x - veh[i].ecefx),2)+pow((projv.y - veh[i].ecefy),2)+  'continued next line'
                pow((projv.z - veh[i].ecefz),2));

if (vr < veh[i].radius)
20              vr = veh[i].radius;

/* calculate distance between cur_veh posn and veh posn */
            dr= sqrt(pow((cur_veh->x-veh[i].ecefx),2) +                  'continued next line'
                pow((cur_veh->y - veh[i].ecefy),2) + pow((cur_veh->z - veh[i].ecefz),2));
25
            if (dr <= (cr + vr))  /* continue checking, potential collision */
            {
            /* perform next level of rough check, see if dr increases */
            if (dr <= veh[i].coll_sep)
30          {
                    veh[i].coll_sep = dr;
                while ((num_secs < max_proj_time) && (coll_watch == FALSE))
                {
```

```
       /* project current position ahead num_secs (num_secs-1 used
          inst current positions without projections while
          assigning a nonzero value to coll_time*/

5     projp.x = cur_veh->x + cur_veh->x_vel * (num_secs-1);
       projp.y = cur_veh->y + cur_veh->y_vel * (num_secs-1);
       projp.z = cur_veh->z + cur_veh->z_vel * (num_secs-1);

/* project vehicle position ahead num_secs*/
10     projv.x = veh[i].ecefx + veh[i].xvel * (num_secs-1);
       projv.y = veh[i].ecefy + veh[i].yvel * (num_secs-1);
       projv.z = veh[i].ecefz + veh[i].zvel * (num_secs-1);

15     /* calculate distance btwn current proj pos & proj veh pos */
       dr = sqrt(pow((projp.x - projv.x),2) + pow((projp.y - projv.y),2) + pow((projp.z - projv.z),2));

if (dr <= (cur_radius + veh[i].radius))
20     {

/* if a collision was previously detected */
         if (veh[i].coll_count > 0)
         {
25         if (num_secs <= veh[i].coll_time)
           {
                  veh[i].coll_time = num_secs;
             veh[i].coll_count++;
             coll_watch = TRUE;
30           no_watch = FALSE;
             layer = WATCH_LAYER;
             if (gpsveh_type == ATC)
             {
               veh[vindex].layer_id = get_ww_layer(veh[vindex].veh_id,WATCH_LAYER);
```

72

```
        }
        else
          layer = get_ww_layer(veh_id,layer);
          veh[i].prev_layer = veh[i].layer_id;
          veh[i].layer_id = get_ww_layer(veh[i].veh_id, WATCH_LAYER);
          coll_condition = TRUE;

}
      else
      {
        if (num_secs > min_warning)
        {
                veh[i].coll_time = 0;
          veh[i].coll_count = 0;
        }
      }
    }
    else
    {
            veh[i].coll_time = num_secs;
      veh[i].coll_count++;
      coll_watch = TRUE;
      no_watch = FALSE;
      layer = WATCH_LAYER;
      if (gpsveh_type == ATC)
      {
      veh[vindex].layer_id = get_ww_layer(veh[vindex].veh_id,WATCH_LAYER);
      }
      else
        layer = get_ww_layer(veh_id,layer);
      veh[i].prev_layer = veh[i].layer_id;
      veh[i].layer_id = get_ww_layer(veh[i].veh_id,WATCH_LAYER);
      coll_condition = TRUE;
    }
```

73

```
            if (veh[i].coll_time > 0)
            {
              if ((veh[i].coll_time < min_warning) || (veh[i].coll_time <    'continued next line'
              mid_warning) && (veh[i].coll_count >= max_coll_count)))
              {
                coll_warning = TRUE;
                no_warning = FALSE;
                layer = WARNING_LAYER;
                if (gpsveh_type == ATC)
                {
                   veh[vindex].layer_id = get_ww_layer(veh[vindex].veh_id, WARNING_LAYER);
                }
                else
                   layer = get_ww_layer(veh_id,layer);
                veh[i].prev_layer = veh[i].layer_id;
                veh[i].layer_id = get_ww_layer(veh[i].veh_id,WARNING_LAYER);
                coll_condition = TRUE;
              }
            }
          } /* if dr */
              num_secs++;
        } /* while */
      } /* if */ else /* vehs are getting further apart */
      {
        veh[i].coll_sep = dr;
        veh[i].coll_time = 0;
        veh[i].coll_count = 0;

}
    }
    else /* rough test failed, no collision */
```

```
        {
          veh[i].coll_time = 0;
          veh[i].coll_count = 0;
          veh[i].coll_sep = DEF_SEP;
        } if ((coll_warning == TRUE) && (gpsveh_type == ATC))
        {
          if (veh1 > veh2)
            sprintf(msg_buf,"COLLISION WARNING VEHICLES %s AND %s",\veh_id,veh[i].veh_id);
          else
            sprintf(msg_buf,"COLLISION WARNING VEHICLES %s AND %s",\veh[i].veh_id,veh_id);
          ATC_Window(msg_buf,1);
        }
        else
        {
          if ((coll_watch == TRUE) && (gpsveh_type == ATC))
          {
            if (veh1 > veh2)
              sprintf(msg_buf,"COLLISION WATCH VEHICLES %s AND %s     ",\veh_id,veh[i].veh_id);
            else
              sprintf(msg_buf,"COLLISION WATCH VEHICLES %s AND %s     ",\veh[i].veh_id,veh_id);
            ATC_Window(msg_buf,1);
          }
        }
        if ((coll_watch == FALSE) && (coll_warning == FALSE));

else coll_condition = TRUE;

} /* if veh_id */

} /* for each vehicle */
```

```
/* determine if watch or warning message should be cleared */ if (gpsvch_type == ATC)
       {
 5        for (k = 0; k < num_vehs; k++)
          {
            if (veh[k].coll_cond == TRUE)
               clear_msg++;
          }
 10       if ((clear_msg == 0) && (coll_condition == FALSE))
          {
            sprintf(msg_buf,"                              ");
            ATC_Window(msg_buf,1);
          }
 15    }
       }
```

ON OR OFF COURSE PROCESSING

The AC&M processing performs mirrored navigational processing using the same coordinate references and waypoints as those aboard the vehicles. In this manner the ATC system can quickly detect off course conditions anywhere in the 3-D airport space envelope and effectively perform zone incursion processing aboard the vehicles and at the AC&M.

The AC&M processing software converts the position and velocity information to the appropriate coordinate frame (zone & map compatible) using techniques described previously. Waypoints based upon the precise 3-dimensional map are used for surface and air navigation in the airport space envelope. The capability is provided to store waypoints in a variety of coordinate systems, such as conventional Latitude, Longitude, Mean Sea Level, State Plane Coordinates, ECEF X, Y, Z and others. The navigational waypoint and on course-off course determinations are preferred to be performed in an ECEF X, Y, Z coordinate frame, but this is not mandatory.

The following mathematical example is provided to show how waypoints and trajectories are processed in Latitude, Longitude, Mean Sea Level and in ECEF X, Y, Z. An actual GNSS flight trajectory is used for this mathematical analysis. The flight trajectory has been previously converted to an ECEF X, Y, Z format as have the waypoints using the previously described techniques. FIGS. 11, 12, 13, 14, 15 are used in conjunction with the following description.

Figure 11:
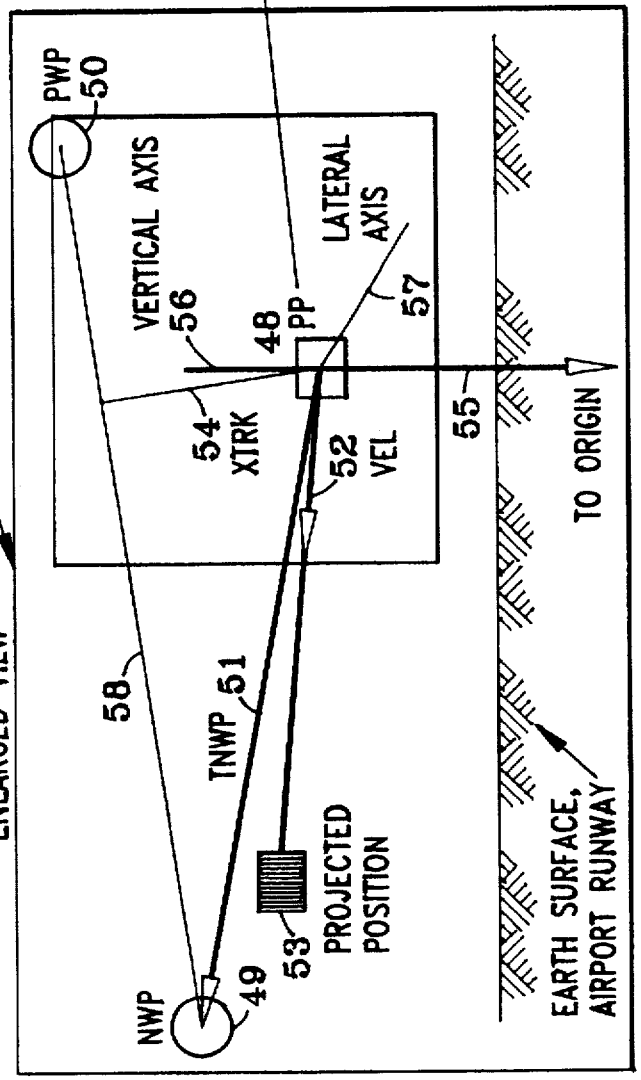
FIG. 11 waypoint processing diagram showing the earth and ECEF coordinate system, expanded view of airport waypoints, further expanded view of previous and next waypoint geometry with present position, the cross hair display presentation used in the developed GPS navigator.
Figure 12:
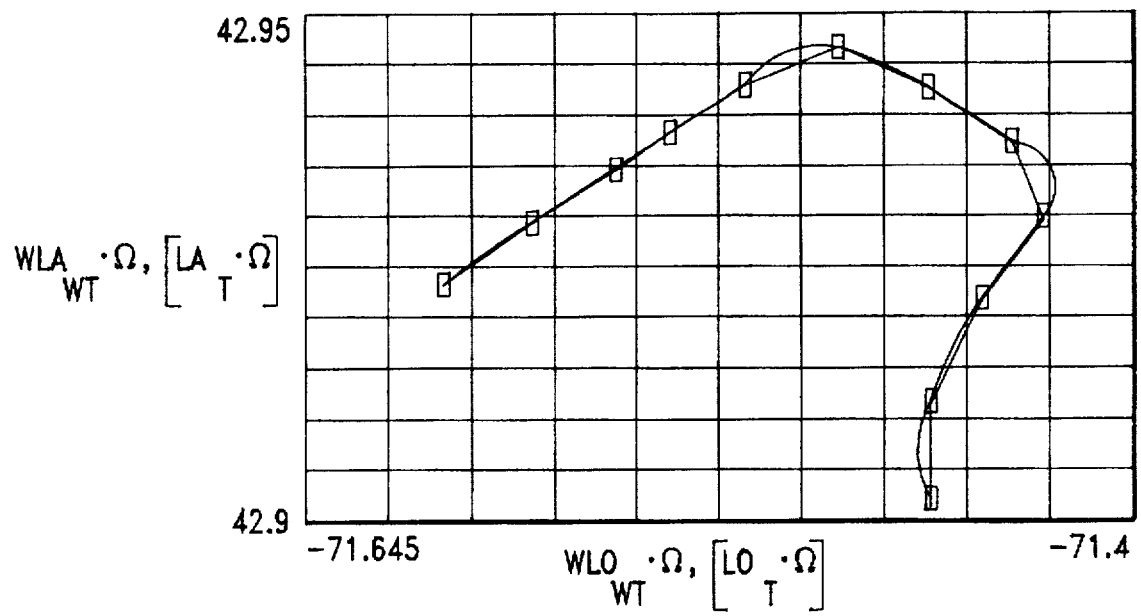
FIG. 12 Latitude, Longitude plot of a missed approach followed by a touch and go with waypoints indicated about every 20 seconds.
Figure 13:
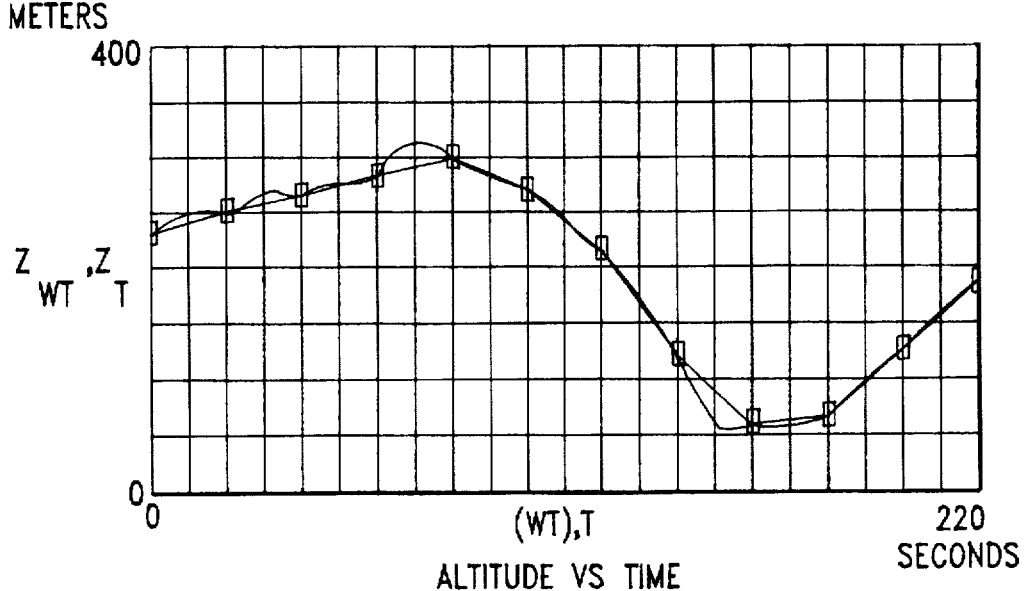
FIG. 13 Altitude vs time for missed approach followed by touch and go, waypoints are indicated about every 20 seconds.

FIG. 11 depicts the ECEF waypoint processing used in the AC&M. The ECEF coordinate system 43 is shown as X,Y,Z, the origin of the coordinate system is shown as 0,0,0. The coordinate system rotates 44 with the earth on its polar axis. The airport 45 is shown as a square patch. An enlarged side view of the airport 46 is shown with 4 waypoints 47. A further enlargement shows the Present Position 48 (PP), the Next Waypoint 49 (NWP) the Previous Waypoint (PWP) 50. The True Course Line 58 is between the Next Waypoint 49 and Previous Waypoint 50. The vector from the Present Position 48 to the Next Waypoint 49 is vector TNWP 51. The Velocity Vector 52 and Time Projected Position is shown as a solid black box 53. The Projected Position 53 is used in zone incursion processing. The 3-D distance to the true coarse is represented by the Cross Track Vector 54 XTRK. The vector normal to the earth surface at the present position and originating at the center of mass of the earth is shown as 55. This vector is assumed to be in the same direction of the vertical axis 56. The lateral axis 57 is perpendicular to the vertical axis and perpendicular to the true course line 58 between the Next Waypoint 49 and the Previous Waypoint 50. The Navigational Display 59 shows the Present Position 48 with respect to the True Course Line 58.

The following equations describe the processing performed in the AC&M while FIGS. 12, 13, 14, and 15 represent plots of the actual trajectory information.

---

Variable Definition

T = Time in seconds
$p_{wT}$ = Earth's radius of curvature at the waypoint
Waypoint indexes through a list of waypoints
Waypoints are indexed as a function of position
$\Omega$ = the number of degrees per radian     57.29577951 3
$\alpha$ = semi major axis, equatorial radius     6378137 meters
e = earth's eccentricity     0.0818182
TALT = ellipsoidal altitude of trajectory position (meters)
WALT = ellipsoidal altitude of the waypoint positions (meters)
$\rho$ = earth's radius of curvature at the position or waypoint
r = 2-d equatorial radius (meters)
R = first estimate of the radius of curvature (meters)
$s\phi$ = the ratio of ECEF Z value divided by R (meters)
RC = radius of curvature at the present position (meters)
h = altitude with respect to the reference ellipsoid (meters)
$\lambda$ = longitude of position in radians
$\phi$ = latitude of position in radiams
ENU = East, North, Up coordinate reference
XYZ = East, North, Up vector distance (meters) to waypoint
VELENU = East, North, Up velocity in (meters/sec)
DISTENU = East, North, Up scalar distance to waypoint
VELEMUMAG = East, North, Up Velocity magnitude (scalar) meters/sec
NBEAR = True North Bearing
Position
$LA_T$ = Latitude    $LO_T$ = Longitude    $TALT_T$ = MSL altitude
Waypoint
$WLA_{wT}$ = Waypoint Lat.    $WLO_{wT}$ = Waypoint Lon.    $WALT_{wT}$ = MSL altitude
Position
$X_T$ = ECEF X    $Y_T$ = ECEF Y    $Z_T$ = ECEF Z
Waypoint
$A_T$ = Waypoint ECEF X    $B_T$ = Waypoint ECEF Y    $C_T$ = Waypoint ECEF Z

EARTH RADIUS OF CURVATURE DETERMINATION $$\rho_{wT} := \sqrt{\frac{\alpha^2}{1 - e^2 \cdot \sin(LA_{wT})^2}} \quad\quad \rho_T := \sqrt{\frac{\alpha^2}{1 - e^2 \cdot \sin(LA_T)^2}}$$

AT WAYPOINT          AT GNSS POSITION

CONVERT TRAJECTORY TO ECEF COORDINATES $$X_T := (TALT_T + \rho_T) \cdot \cos(LA_T) \cdot \cos(LO_T)$$
$$Y_T := (TALT_T + \rho_T) \cdot \cos(LA_T) \cdot \sin(LO_T)$$

-continued $$Z_T := [TALT_T + \rho_T \cdot (1 - e^2)] \cdot \sin(LA_T)$$

CONVERT WAYPOINTS TO ECEF COORDINATES $$A_{wT} := (WALT_{wT} + \rho_{wT}) \cdot \cos(WLA_{wT}) \cdot \cos(WLO_{wT})$$
$$B_{wT} := (WALT_{wT} + \rho_{wT}) \cdot \cos(WLA_{wT}) \cdot \sin(WLO_{wT})$$
$$C_{wT} := [WALT_{wT} + \rho_{wT} \cdot (1 - e^2)] \cdot \sin(WLA_{wT})$$

FIND VECTOR FROM PRESENT POSITION TO NEXT WAYPOINT

T = TIME OF TRAJECTORY DATA MATRIX INDEX
TIME INTO TRAJECTORY = 61 SECONDS
CONSTRUCT ECEF WAYPOINT MATRIX Q $$Q := \begin{bmatrix} A_0 & B_0 & C_0 \\ A_N & B_N & C_N \\ A_{2\cdot N} & B_{2\cdot N} & C_{2\cdot N} \\ A_{3\cdot N} & B_{3\cdot N} & C_{3\cdot N} \\ A_{4\cdot N} & B_{4\cdot N} & C_{4\cdot N} \\ A_{5\cdot N} & B_{5\cdot N} & C_{5\cdot N} \\ A_{6\cdot N} & B_{6\cdot N} & C_{6\cdot N} \\ A_{7\cdot N} & B_{7\cdot N} & C_{7\cdot N} \end{bmatrix}$$

WAYPOINT SELECTION CRITERIA #1 TIME BASED

TIME BASED WAYPOINT SELECTION TECHNIQUE
DETERMINE NEXT WAYPOINT FROM PRESENT POSITION $$G_n := \text{until}\left[\left[\frac{T}{N \cdot (1+n)}\right] - 1, n+1\right]$$

WAYPOINT SELECTION CRITERIA #2 POSITION BASED
UTILIZES THE CONCEPT OF ZONES, SEE ZONES $$Q = \begin{bmatrix} 1491356.373377693 & -4435534.380128561 & 4319696.328998308 \\ 1491105.506082756 & -4434843.777395391 & 4320510.100123271 \\ 1491191.231021753 & -4434078.221408217 & 4321279.195524782 \\ 1491403.123106249 & -4433316.762941022 & 4322016.015673301 \\ 1491013.940737782 & -4432855.368457528 & 4322641.896808126 \\ 1490386.073951513 & -4432652.821583812 & 4323015.562834505 \\ 1489735.707050711 & -4432541.026386314 & 4323262.840511303 \\ 1489205.896384193 & -4432860.450400459 & 4322985.406680132 \end{bmatrix}$$

DETERMINE VECTOR BETWEEN PREVIOUS AND THE NEXT WAYPOINT $$Qa := (Q_{a+1,0} - Q_{a,0} \quad Q_{a+1,1} - Q_{a,1} \quad Q_{a+1,2} - Q_{a,2})$$
$$PP := (X_T \ Y_T \ Z_T) \quad \text{PRESENT POSITION}$$
$$NWP := [A_{N \cdot (1+a)} \ B_{N \cdot (1+a)} \ C_{N \cdot (1+a)}] \quad \text{NEXT WAYPOINT}$$
$$TNWP := NWP - PP \quad \text{VECTOR DISTANCE TO THE NEXT WAYPOINT}$$

AT FLIGHT TIME T = 61 SECONDS, THE NEXT WAYPOINT IS THE FOLLOWING
X, Y, Z DISTANCE FROM THE CURRENT POSITION
TNWP = (−394.0104406164  424.5394341322  588.6638708804)

DETERMINE THE MAGNITUDE OF THE DISTANCE TO THE WAYPOINT $$DIST := \sqrt{(TNWP^{<0>})^2 + (TNWP^{<1>})^2 + (TNWP^{<2>})^2}$$

DIST = 825.8347966318 METERS

NEXT DETERMINE IF THE SPEED SHOULD REMAIN THE SAME, OR CHANGE
TIME EXPECTED AT NEXT WAYPOINT IS 80 SECONDS INTO TRAJECTORY
CURRENT VELOCITY IS BASED UPON GNSS RECEIVER DETERMINATION $$VX := \frac{TNWP^{<0>}}{80 - T}$$

VX = −20.7373916114 M/S × ECEF VELOCITY TO REACH WAYPOINT ON TIME

COMPARE CURRENT X VELOCITY TO REQUIRED X VELOCITY, IF LESS INCREASE
IN VELOCITY, IF GREATER THAN REQUIRED VELOCITY DECREASE VELOCITY $$VY := \frac{TNWP^{<1>}}{80 - T}$$

VY = 22.3441807438 M/S Y ECEF VELOCITY TO REACH WAYPOINT ON TIME

COMPARE CURRENT Y VELOCITY TO REQUIRED Y VELOCITY, IF LESS INCREASE
IN VELOCITY, IF GREATER THAN REQUIRED VELOCITY DECREASE VELOCITY

-continued $$VZ := \frac{TNWP^{\langle 2 \rangle}}{80 - T}$$

VZ = 30.9823089937 M/S  Z ECEF VELOCITY TO REACH WAYPOINT ON TIME

COMPARE CURRENT Z VELOCITY TO REQUIRED Z VELOCITY, IF LESS INCREASE
IN VELOCITY, IF GREATER THAN REQUIRED VELOCITY DECREASE VELOCITY $$VELECEF = \sqrt{(VX)^2 + (VY)^2 + (VZ)^2}$$  VELOCITY MAGNITUDE

VELECEF = 43.4649892964 M/S
VELECEF = (-20.737  22.344  30.982)

DETERMINE THE ON COURSE OFF COURSE NAVIGATIONAL DATA

UNIT VECTOR PERPENDICULAR TO PLANE OF QA AND TNWP $$NP := \frac{Qa^T \times TNWP^T}{|Qa^T \times TNWP^T|}$$

$$NP = \begin{pmatrix} 0.2375540749 \\ -0.7054483132 \\ 0.6677654819 \end{pmatrix}$$

UNIT VECTOR PERPENDICULAR TO PLANE OF QA AND NP $$UN := \frac{NP \times Qa^T}{|NP \times Qa^T|}$$

$$UN = \begin{pmatrix} -0.8621137731 \\ -0.4698689823 \\ -0.1896918074 \end{pmatrix}$$

CROSS TRACK ERROR
XTRK := UN · TNWP$^T$
XTRK = 28.5392020973
CALCULATE CROSS TRACK VECTOR

VXTRK := XTRK · UN $$VXTRK = \begin{pmatrix} -24.6040392 \\ -13.4096858447 \\ -5.4136528281 \end{pmatrix}$$

UNIT VECTOR FROM PRESENT POSITION TO NEXT WAYPOINT $$UTNWP := \frac{TNWP^T}{|TNWP^T|}$$

$$UTNWP = \begin{pmatrix} -0.4771056417 \\ 0.514073076 \\ 0.7128106896 \end{pmatrix}$$

UNIT VECTOR OF PRESENT POSITION $$UPP := \frac{PP^T}{|PP^T|}$$

$$UPP = \begin{pmatrix} 0.2341833314 \\ -0.6961209085 \\ 0.6786559129 \end{pmatrix}$$

UNIT VECTOR OF NEXT WAYPOINT $$UNWP := \frac{NWP^T}{|NWP^T|}$$

$$UNWP = \begin{pmatrix} 0.2341210312 \\ -0.6960529621 \\ 0.6787470933 \end{pmatrix}$$

CHECK AGAINST GREAT CIRCLE TECHNIQUE

GREAT CIRCLE ANGLE β := acos(UNWP · UPP)  β · Ω = 0.0074290102 DEGREES
DETERMINE RANGE TO NEXT WAYPOINT FROM PRESENT POSITION h = 0
SHOULD BE THE SAME AS DIST WHEN ALT IS NEARLY AT ELLIPSOID $$R3 := (|NWP^T| + |PP^T|) \cdot \frac{\beta}{2}$$   R3 = 825.7511698494   R3 − DIST = −0.0836267824
                                                                     METERS           METERS "THE ECEF ANALYSIS COMPARES TO GREAT CIRCLE ANALYSIS VERY CLOSELY"
CONVERTING BACK TO LAT, LON AND MSL
DETERMINE GEODETIC PARAMETERS (LAT, LON & EL)

$$r := \sqrt{(PP^{\langle 0 \rangle})^2 + (PP^{\langle 1 \rangle})^2}$$   $$R := \sqrt{(1-e^2)^2 \cdot r^2 + (PP^{\langle 2 \rangle})^2}$$

$$s\phi := \sqrt{\frac{(PP^{\langle 2 \rangle})^2}{R^2}}$$

$$RC := \sqrt{\frac{\alpha^2}{1 - e^2 \cdot s\phi^2}}$$

$$h := \frac{R - (1 - e^2) \cdot RC}{1 - e^2 + e^2 \cdot s\phi^2}$$   h = 287.6967718417

$$\lambda := \operatorname{atan}\left[\frac{(PP^T)_1}{(PP^T)_0}\right]$$   $$\phi := \operatorname{atan}\left[\frac{(PP^T)_2}{r \cdot (1 - e^2)}\right]$$   $\lambda \cdot \Omega = -71.40645$
$\phi \cdot \Omega = 42.930575339$

CONVERT TO ENU COORDINATES

-continued $$ENU := \begin{bmatrix} -\sin(\lambda) & \cos(\lambda) & 0 \\ -\sin(\phi)\cdot\cos(\lambda) & -\sin(\phi)\cdot\sin(\lambda) & \cos(\phi) \\ \cos(\phi)\cdot\cos(\lambda) & \cos(\phi)\cdot\sin(\lambda) & \sin(\phi) \end{bmatrix}$$

FIND ENU VECTOR FROM PRESENT POSITION TO NEXT WAYPOINT

EAST DISTANCE
NORTH DISTANCE
UP DISTANCE $$XYZ := ENU \cdot (TNWP^T) \qquad XYZ = \begin{pmatrix} -238.0792858938 \\ 790.6424859464 \\ 14.3465805212 \end{pmatrix}$$

EAST VEL.
NORTH VEL.
UP VEL.

$$VELENU := ENU \cdot (VELECEF^T) \; M/S \qquad VELENU = \begin{pmatrix} -12.5301751909 \\ 41.6123344504 \\ 0.7550895802 \end{pmatrix}$$

$$DISTENU := \sqrt{(XYZ_0)^2 + (XYZ_1)^2 + (XYZ_2)^2}$$

DIST = 825.8347966318 METERS $$VELENUMAG := \sqrt{(VELENU_0)^2 + (VELENU_1)^2 + (VELENU_2)^2}$$

VELENUMAG = 43.4644892872 M/S
THE ECEF APPROACH AND THE ENU APPROACH PRODUCE THE SAME
RESULTS SO IT IS POSSIBLE TO USE EITHER COORDINATE REFERENCE TO
CONTROL THE NECESSARY SPEED TO THE WAYPOINT
FIND TRUE NORTH BEARING ANGLE TO NEXT WAYPOINT USING TANGENT $$NBEAR := atan\left(\frac{XYZ_0}{XYZ_1}\right) \cdot \Omega \qquad NBEAR = -16.7581666051 \; DEGREES$$

ADJUST FOR TRIGONOMETRIC QUADRANTS AND YOU HAVE THE TRUE BEARING

Should the Range to the Waypoint become larger than the previous range of the waypoint a waypoint may not have automatically indexed. This situation could occur if the vehicle did not get close enough to the waypoint to index automatically or an ADS message may have been garbled and the waypoint did not index, due to a lost ADS message. In this case the following analysis is performed:

a) temporarily increment the waypoint index
b) find the vector between the vehicles present position (PP) and the next waypoint (NWP)
Vector to the next waypoint, TNWP=NWP(X,Y,Z)−PP(X,Y,Z)
c) Determine the current vehicle velocity vector

VEL=(VX,VY,VZ)

d) Determine the Dot Product between the Velocity Vector and Vector TNWP

COS θ=TNWP dot VEL e) If A<COS θ<B then keep current waypoint index
Where A and B are between 0 and 1 and represent an adjustable value based on the allowable vehicle velocity angular deviation from the true course
If −1<COS θ<=0 then return to previous waypoint index and generate wrong way alert The above technique can be expanded to in&& curved approach, using cubic splines to smooth the transitions between waypoints. A curved trajectory requires changes to the above set of equations. Using the technique of cubic splines, one can calculate three cubic equations which describe smooth (continuous first and second derivatives) curves through the three dimensional ECEF waypoints. The four dimensional capability is possible when the set of cubic equations is converted into a set of parametric equations in time. The table below depicts an ECEF waypoint matrix which is used in cubic spline determinations.

Waypoint Matrix (SEE Q MATRIX)

Typical Waypoint ECEF Matrix

Figure 16:
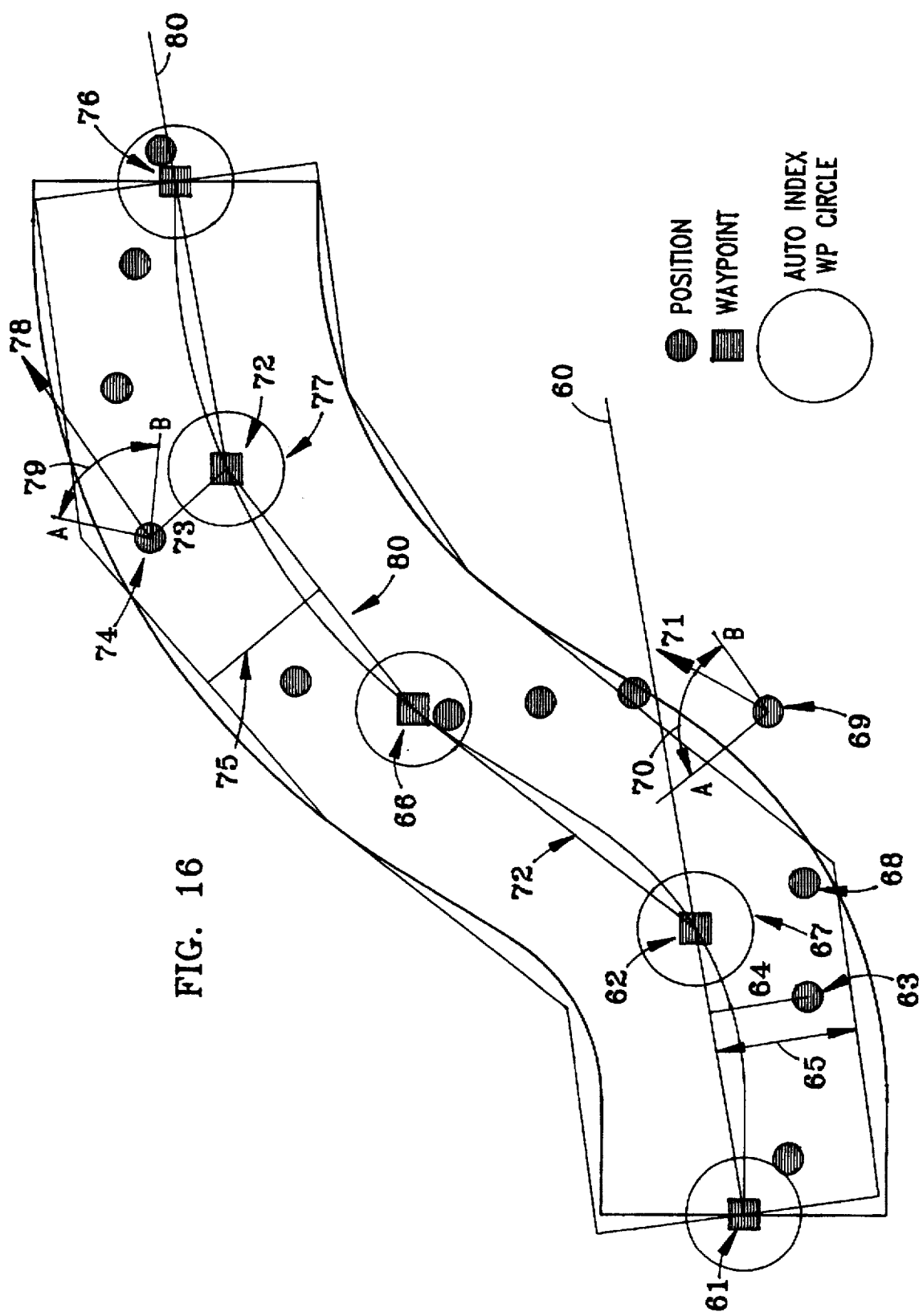
FIG. 16 shows a block diagram of on\off course processing.

The AC&M processing utilizes the combination of precise ECEF X, Y, Z navigation and waypoints. Waypoints may be stored in a data file for a particular runway approach, taxi path or departure path. Waypoints may be entered manually, through the use of a data entry device. A list of waypoints describing a flight and or taxi trajectory is then assigned to a particular vehicle. To further supplement waypoint processing expected arrival time may be added to each waypoint as well as velocity ranges for each phase of flight. In this manner, 4 dimensional airport control and management is provided utilizing a GNSS based system. Mathematical processing is used in conjunction with precise waypoints to define flight trajectories. The mathematics typically uses cylindrical shapes but is not limited to cylinders, cones may also be used, and are defined between adjacent waypoints. Typical on or off course processing is outlined below and is shown in FIG. 16.

EXAMPLE 1

MISSED WAYPOINT, WITH OFF COURSE CONDITION a. Construct the True Course line between the previous waypoint 61 and the next waypoint 62 b. Determine the shortest distance (cross track error 64) from the current position 63 to the line 60 between the previous waypoint 61 and next waypoint 62 c. Determine the magnitude of cross track error d. Compare the magnitude of the cross track error to a predefined limit for total off course error shown as 65 in the figure.

e. Construct an mathematical cylindrical zone centered on the line between the previous 61 and next waypoint 62 with radius equal to the off course threshold 65.

f. If the magnitude of the cross track error 64 is greater than the off course threshold 65 then raise flag and generate alert (off course).

g. Determine the necessary velocity to reach next waypoint on schedule, as shown previously h. Is necessary velocity within preset limits or guidelines?

i. Check actual current velocity against preset limits and necessary velocity. If above preset limits, raise flag and issue alert to slow down. If below preset limits, raise flag and issue alert to speed up j. Automatically index to the following waypoint 66 when the position is within the index waypoint circle 67 k. Should wrong way be detected (positions 68 and 69), index ahead to the next to waypoint pair 66 and 62 and check direction of travel 71 (Velocity) against the line 72 between the waypoints 66 and 62, if the direction of travel is within a preset angular range 70 (A to B degrees) and not off course. If the cheek is true meaning not off course and headed towards next waypoint then index permanently to waypoint set 66 and 62, no alert generated l. In the event that an off course condition and wrong way occur (position 69) a message is formatted which updates the layer filter for the target which is off course, an alert is generated, the waypoints are returned to the initial settings and action is taken to bring vehicle back on course possibly using a set of new waypoints m. In the event of a velocity check which indicates that the speed up or slow down velocity is outside of an approved range, generate a warning the speed for vehicle is out of established limits. Preset speed over ground limits are adjusted for current air wind speed.

n. The controller reviews the situation displayed and if necessary invokes a navigational correction message to be sent to the Real Time Communication Handler, and then broadcast by radio to the aircraft off course or flying at the wrong speed. The controller at this time may change the expected arrival time at the next waypoint if so necessary

EXAMPLE 2

MISSED WAYPOINT, WITH ON COURSE PROCESSING a. Construct the True Course line between the previous waypoint 66 and the next waypoint 72 b. Determine the shortest distance (cross track error 73) from the current position 74 to the line between the previous waypoint 66 and next waypoint 72 c. Determine the magnitude of cross track error d. Compare the magnitude of the cross track error to a predefined limit for total off course error shown as 75 in the figure.

e. Construct an mathematical cylindrical zone centered on the line between the previous waypoint 66 and next waypoint 72 with radius equal to the off course threshold 75 f. If the magnitude of the cross track error 73 is greater than the off course threshold 75 then raise flag and generate alert (off course).

g. Determine the necessary velocity to reach next waypoint on schedule, as shown previously h. Is necessary velocity within preset limits or guidelines?

i. Check actual current velocity against preset limits and necessary velocity. If above preset limits, raise flag and issue alert to slow down. If below preset limits, raise flag and issue alert to speed up j. Automatically index to the following waypoint 76 when the position is within the index waypoint circle 77 k. Should wrong way be detected (position 74), index ahead to the next to waypoint pair 76 and 72 and check direction of travel 78 (Velocity) against the the line 80 between the waypoints 76 and 72, if the direction of travel is within a preset angular range 79 (A to B degrees) and not off course. If the check is true meaning not off course and headed towards next waypoint then index permanently to waypoint set 76 and 72, no alert generated l. In the event of a velocity check which indicates that the speed up or slow down velocity is outside of an approved range, generate a warning the speed for vehicle is out of established limits, Preset speed over ground limits are adjusted for current air wind speed.

m. The controller reviews the situation displayed and if necessary invokes a navigational correction message to be sent to the Real Time Communication Handler, and then broadcast by radio to the aircraft off course or flying at the wrong speed. The controller at this time may change the expected arrival time at the next waypoint if so necessary The AC&M processing performs all on or off course processing determinations and the displays information related to on or off course or late or early arrival conditions. While FIG. 17 summarizes speed up-slow down information in graphical form 80 and distance to the waypoint 81 from an actual GNSS landing. The neutral line 82 labelled "0" translates to no velocity change is necessary to reach next waypoint on time.

ALERT DISPLAY FUNCTION

Within the AC&M system collision alerts, zone, off course and improper speed warnings are handled somewhat differently than normal position updates. When the AC&M processing recognizes a warning condition, the aircraft(s)/vehicle(s) involved are moved to a special ALP layer. The layer filter controls what graphic parameters a particular vehicle or aircraft is displayed with. The change in the layer from the default vehicle layer signifies that the target has been classified as a potential collision, zone intrusion risk. off course condition or improper speed.

AC&M CONTROL ZONES

ATC Control Zones are used to sort and manage air and surface traffic within the airport space envelope. The AC&M Control Area is divided into AC&M Control Zones. Typically the outer most airport control zone interfaces with an en route zone. Aircraft within the 3-D AC&M zone transmit their GNSS derived positions via an on board datalink. The GNSS data is received by the airport AC&M equipment. The AC&M Processing determines the ECEF AC&M Control Zone assignment based on the aircraft's current position and assigns the aircraft to the map layer associated with that Control Zone. Mathematical computations as defined previously, are used to determine when a vehicle is in a particular control zone.

As an aircraft enters the AC&M or transitions to another ATC Control Zone, a handoff is performed between the controllers passing and receiving control of that aircraft. Surface traffic is handled in the same manner. With this AC&M scenario, each controller receives all target information but suppresses those layers that are not under his control. In this manner the controller or operator views on those vehicles or aircraft in his respective control zone. Should there be a collision condition across an ATC zone boundary the conflicting vehicles will be displayed in a non-surpressable layer.

All targets within an AC&M Control Zone would be placed in the appropriate map layer for tracking and display purposes. Layer coding for each tracked target can be used to control graphic display parameters such as line type, color, line width as well as be used as a key into the underlying database for that object.

Additional AC&M Control Zones may be defined for other surface areas of the airport, such as construction areas, areas limited to specific type of traffic, weight limited areas and others. These areas may be handled through ATC but will most likely be controlled by airline or airport maintenance departments. The concept of a zone based AC&M system integrated with 3-D map information provides a valuable management and navigational capability to all vehicles and aircraft within the airport space envelope.

ENTERING WAYPOINTS

The AC&M processing defined herein allows the user to enter waypoints using the digital map as a guide. To enter a series of waypoints the controller simply uses the map which may provide plan and side views of the airport space envelope. The cursor is moved to the appropriate point and a selection is made by pressing a key. The position is then stored in a list with other waypoints entered at the same time. The user is then prompted to enter a name for the waypoint list and an optional destination. Lastly, the waypoints converted the appropriate coordinate frame and are then saved to a file or transmitted to a particular vehicle. In this manner the user may add and define waypoints.

DEFINING ZONES

The user may define zones using the digital map as a guide. To enter a series of zones the controller simply uses the map which may provide plan and side views of the airport space envelope. The cursor is moved to the appropriate point and a selection is made by pressing a key. The position is then stored in a list with other zone definition points. The controller is then prompted to enter a name for the zone (pole, tower, construction area, etc.) and type of zone (circle, sphere, box, cylinder, etc.). Lastly, the zones are converted to the appropriate coordinate frame and saved to a file or transmitted to a particular vehicle. In this manner the user may define additional zones.

The ability to quickly and accurately define zones is key to the implementation of a zones based AC&M capability. It is obvious that minor changes may be made in the form and construction of the invention without departing from the material spirit thereof. It is not, however, desired to confine the invention to the exact form herein shown and described, but is desired to include all such as properly come within the scope claimed.

The invention having thus been described, and what is claimed as new and desired to secure by Letters of Patent is:

1. A method for GNSS compatible traffic management using a computer system incorporating zone incursion processing located on a vehicle including aircraft and surface vehicular equipment, said method comprising the steps of:
   a. adopting a coordinate reference system for processing by said computer system, where said adopted coordinate reference system is the Earth Centered Earth Fixed coordinate reference;
   b. selecting a geographical region for said traffic management; said selected region being referenced to said adopted coordinate reference system;
   c. establishing a static zones database, for said selected region, said static zones database containing descriptive data representing selected spatial characteristics referenced to said adopted coordinate reference system;
   d. determining GNSS position data of said vehicle;
   e. establishing a vehicle database, said vehicle database containing said position data referenced to said adopted coordinate reference system;
   f. determining if said position data of said vehicle database incur a static zone, said static zone being defined within said static zones database; and
   g. enabling a static zone incursion flag for said vehicle if said position data incur said static zone of said static zones database thereby making a static zone incursion alert.

2. The method for traffic management according to claim 1 further comprising: generating incursion alerts, said generation of incursion alerts comprising the steps of:
   establishing a travel path waypoints database, said travel path waypoints database containing waypoints referenced to said adopted coordinate reference system;
   b. generating for said vehicle an assigned travel path, selected from said travel path waypoints database;
   c. enabling said static zone incursion flag for static zones not intersecting said assigned travel path; and
   d. generating a static zone incursion alert for said vehicle when said vehicle position incurs a static zone of said static zone database with said static zone incursion flag enabled.

3. A method for traffic management according to claim 2 further comprising, masking generation of false static zone incursion alerts, said masking generation of false static zone incursion alerts comprising the steps of;
   a. disabling said static zone incursion flag for static zones intersecting said assigned travel path, thereby masking the generation of said false static zone incursion alerts along said assigned travel path.

4. A method for GNSS compatible on and off course processing traffic management using a computer system located aboard a vehicle, said vehicle including aircraft and surface vehicular equipment, said method comprising the steps of:
   a. adopting a coordinate reference system for processing by said computer system, where said adopted coordinate reference system is the GNSS Earth Centered Earth Fixed coordinate reference;
   b. selecting a geographical region for said traffic management, said selected region being referenced to said adopted coordinate reference system;

c. establishing a travel path waypoints database for said region, said waypoints database containing descriptive data representing waypoint characteristics referenced to said adopted coordinate reference system;

d. determining GNSS position data of said vehicle;

e. establishing a vehicle database, said vehicle database containing said position data referenced to said adopted coordinate reference system;

f. generating for said vehicle an assigned travel path selected from said waypoints database;

g. determining the previous and next waypoints along said assigned travel path;

h. establishing for said vehicle, a route zone for said assigned travel path, using said previous and next waypoints;

i. determining if said vehicle position data contained in said vehicle database is outside of said route zone; and j. setting for said vehicle an off course flag when said position data of said vehicle database is outside of said route zone, thereby making an off course alert when said vehicle is off course.

5. A method for GNSS compatible vehicle traffic management according to claim 4 utilizing wrong way monitoring, said method further comprising the steps of:

a. determining a true course vector to said next waypoint from said position data contained in said vehicle database;

b. determining a velocity vector of said vehicle in said adopted coordinate reference system;

c. determining the angle between said true course vector and said velocity vector; and d. setting for said vehicle a wrong way flag if said angle is not within a specified acceptable numerical range, thereby generating an alert for said vehicle when said vehicle is traveling in the wrong direction.

6. The method for traffic management according to claim 5 further comprising; the step of disabling said off course alert if said position data for said vehicle contained in said vehicle database is outside of said route zone and said vehicle wrong way flag is not set.

7. The method for vehicle traffic management according to claim 5 further comprising:

a. determining the range to said next waypoint from said position data in said vehicle database; and b. incrementing automatically to the next waypoint pair in said waypoints database when said range to said next waypoint is within a predetermined distance.

8. The method for traffic management according to claim 5 further comprising reducing incidence of wrong way false alerts, said reducing incidence of wrong way false alerts comprising the steps of;

a. incrementing to the next pair of previous and next waypoints contained in said waypoints database when said wrong way flag is set;

b. determining the current GNSS position and a previous position for said vehicle using said vehicle database, wherein said current position becomes said previous position upon the receipt of a new position in said vehicle database, and said new position becoming said current position;

c. determining the current distance to said next waypoint from said current position when said wrong way flag is set;

d. determining the previous distance to said next waypoint from said previous position when said wrong way flag is set;

e. comparing said previous distance to said current distance; and f. clearing said vehicle wrong way flag when said current distance is smaller than said previous distance.

9. A method for GNSS compatible vehicle traffic management using a computer system located on a vehicle, incorporating collision detection processing between at least two vehicles of a plurality of vehicles, said plurality of vehicles including aircraft and surface vehicular equipment said method comprising the steps of:

a. adopting a coordinate reference system for processing by said computer system, where said adopted coordinate reference system is the GNSS Earth Centered Earth Fixed coordinate reference;

b. selecting a geographical region for said traffic management, said selected region being referenced to said adopted coordinate reference system;

c. establishing a vehicle database, said vehicle database containing identification, position and velocity information, determining a time of applicability for said position and velocity information which is referenced to said adopted coordinate reference system for said at least two vehicles operating in said selected region;

d. determining a type classification for said at least two vehicles using said identification information contained in said vehicle database;

e. determining a manner of movement and operation for said at least two vehicles, using said information contained in said vehicle database;

f. constructing for said at least two vehicles dynamic zones, wherein each of said dynamic zones is sized based on said type classification and said manner of movement and operation of said at least two vehicles using said identification, position and velocity information in said vehicle database;

g. generating time-based projected positions for said at least two vehicles using said vehicle database;

h. generating projected dynamic zones for said at least two vehicles using said projected positions;

i. determining if at least two of said projected dynamic zones intersect; and j. setting a collision flag for at least one of said at least two vehicles having said projected dynamic zones intersect with at least one other projected dynamic zone thus generating an alert indicating a potential collision condition.

10. A method for GNSS compatible vehicle traffic management using a computer system located on a vehicle, incorporating speed up or slow down indicators for vehicles including aircraft and surface vehicular equipment, said method comprising the steps of:

a. adopting a coordinate reference system for processing by said computer system, where said adopted coordinate reference system is the GNSS Earth Centered Earth Fixed coordinate reference;

b. selecting a geographical region for said traffic management, said selected region being referenced to said adopted coordinate reference system;

c. establishing a travel path waypoints database for said selected geographical region, said travel path waypoints containing waypoints referenced to said adopted coordinate reference system where said waypoints include a position with an arrival time;

d. determining GNSS position data of said vehicle;

e. establishing a vehicle database, said vehicle database containing said position data referenced to said adopted coordinate reference system for said vehicle operating in said selected region;

f. generating for said vehicle an assigned travel path selected from said travel path waypoints database;

g. determining previous and next waypoints with desired arrival times along said assigned travel path;

h. determining for said vehicle a distance from the current position to the next waypoint;

i. establishing a current time;

j. determining a remaining time for said vehicle to reach said next waypoint by subtracting said current time from said desired arrival time associated with said next waypoint;

k. calculating for said vehicle a necessary velocity to reach said next waypoint at said desired arrival time, by dividing said distance by said remaining time;

l. determining the current velocity of said vehicle;

m. comparing said necessary velocity to said current velocity;

n. providing for said vehicle increase or decrease velocity guidance based upon said comparing of said necessary velocity to said current velocity.

11. The method for traffic management according to claim 10 further comprising generating velocity warnings, said generating velocity warnings comprising the steps of:

a. establishing a database of desired velocity ranges for various manner of movements, b. determining the current manner of movement of said vehicle;

c. selecting a desired velocity range for said vehicle, based upon said current manner of movement, from said database of desired velocity ranges;

d. comparing said current velocity to said selected desired velocity range; and e. generating a velocity alert when said current velocity of said vehicle is outside said selected desired velocity range.

* * * * *